United States Patent
Sato

(10) Patent No.: US 9,569,861 B2
(45) Date of Patent: Feb. 14, 2017

(54) IMAGE PROCESSING DEVICE AND IMAGE PROCESSING METHOD FOR ENCODING A BLOCK OF AN IMAGE

(71) Applicant: SONY CORPORATION, Tokyo (JP)

(72) Inventor: Kazushi Sato, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/812,282

(22) Filed: Jul. 29, 2015

(65) Prior Publication Data

US 2015/0334392 A1 Nov. 19, 2015

Related U.S. Application Data

(63) Continuation of application No. 14/003,253, filed as application No. PCT/JP2012/059168 on Apr. 4, 2012, now Pat. No. 9,153,040.

(30) Foreign Application Priority Data

| Jun. 3, 2011 | (JP) | 2011-125473 |
| Jun. 30, 2011 | (JP) | 2011-145411 |
| Sep. 27, 2011 | (JP) | 2011-210542 |

(51) Int. Cl.

| G06K 9/00 | (2006.01) |
| G06T 9/00 | (2006.01) |
| H04N 19/176 | (2014.01) |
| H04N 19/105 | (2014.01) |
| H04N 19/593 | (2014.01) |

(Continued)

(52) U.S. Cl.
CPC ............. *G06T 9/004* (2013.01); *H04N 19/105* (2014.11); *H04N 19/157* (2014.11); *H04N 19/176* (2014.11); *H04N 19/186* (2014.11); *H04N 19/593* (2014.11)

(58) Field of Classification Search
None
See application file for complete search history.

(56) References Cited

U.S. PATENT DOCUMENTS

| 8,391,369 B2 * | 3/2013 | Han | H04N 19/593 375/240.13 |
| 8,488,889 B2 | 7/2013 | Moriya et al. | |

(Continued)

FOREIGN PATENT DOCUMENTS

| CN | 101193305 A | 6/2008 |
| CN | 101198051 A | 6/2008 |

OTHER PUBLICATIONS

Jun. 2, 2016, Chinese Office Action for related CN Application No. 201280025736.3.
Jun. 7, 2016, Chinese Office Action for related CN Application No. 201280025681.6.

(Continued)

*Primary Examiner* — Andrae S Allison
(74) *Attorney, Agent, or Firm* — Paratus Law Group, PLLC

(57) ABSTRACT

Provided is an image processing apparatus including a prediction section that generates a predicted value of a color difference component of a pixel of an image to be decoded by using a function of a value of a corresponding luminance component, a coefficient calculation section that calculates a coefficient of the function used by the prediction section by referencing a pixel around a block to which the pixel belongs, and a controller that controls a ratio of a number of reference pixels used by the coefficient calculation section to a block size of the block.

15 Claims, 32 Drawing Sheets

(51) Int. Cl.
*H04N 19/186* (2014.01)
*H04N 19/157* (2014.01)

(56) References Cited

U.S. PATENT DOCUMENTS

| | | | |
|---|---|---|---|
| 8,509,551 B2 | 8/2013 | Moriya et al. | |
| 8,666,182 B2 | 3/2014 | Kim et al. | |
| 8,675,978 B2* | 3/2014 | Sato | G06T 9/004 382/232 |
| 8,861,848 B2* | 10/2014 | Sato | G06T 9/004 382/166 |
| 2003/0067979 A1* | 4/2003 | Takahashi | H04N 19/56 375/240.03 |
| 2007/0140576 A1* | 6/2007 | Sato | H04N 19/176 382/251 |
| 2008/0037642 A1* | 2/2008 | Tsuchiya | H04N 19/51 375/240.16 |
| 2008/0159641 A1* | 7/2008 | Moriya | H04N 19/139 382/239 |
| 2012/0287995 A1* | 11/2012 | Budagavi | H04N 19/436 375/240.12 |
| 2014/0003512 A1 | 1/2014 | Sato | |
| 2014/0376631 A1* | 12/2014 | Sato | G06T 9/004 375/240.12 |

OTHER PUBLICATIONS

Chen, et al., "CE6.a.4: Chroma intra prediction by reconstructed luma samples", Joint Collaborative Team on Video Coding (JCT-VC) of ITU-T SG16 WP3 and ISO/IEC JTC1/SC29/WG11, Mar. 16-23, 2011, pp. 1-10, 5$^{th}$ Meeting: Geneva, CH.

\* cited by examiner

| Rm | Ra | Rb | Rc | Rd | Re | Rf | Rg | Rh |
|---|---|---|---|---|---|---|---|---|
| Ri | a | b | c | d | | | | |
| Rj | e | f | g | h | | | | |
| Rk | i | j | k | l | | | | |
| Rl | m | n | o | p | | | | |

Rz : ENCODED (FOR REFERENCE)

z : ENCODING TARGET

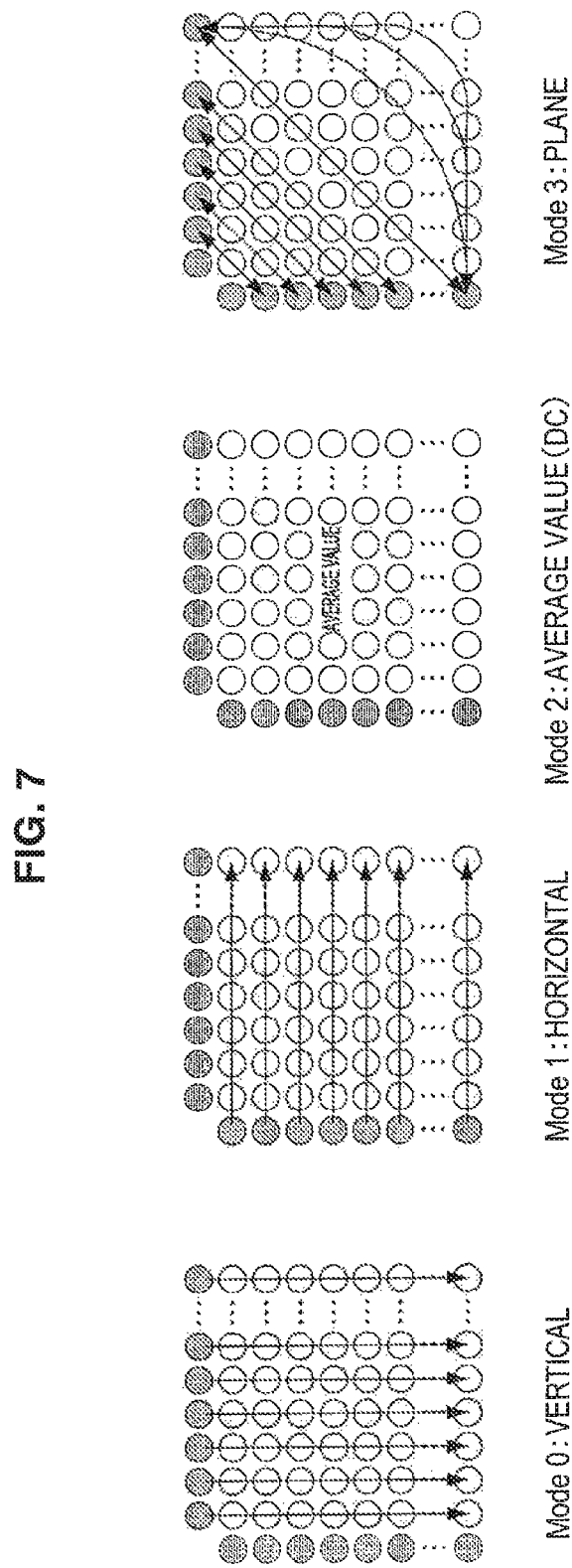

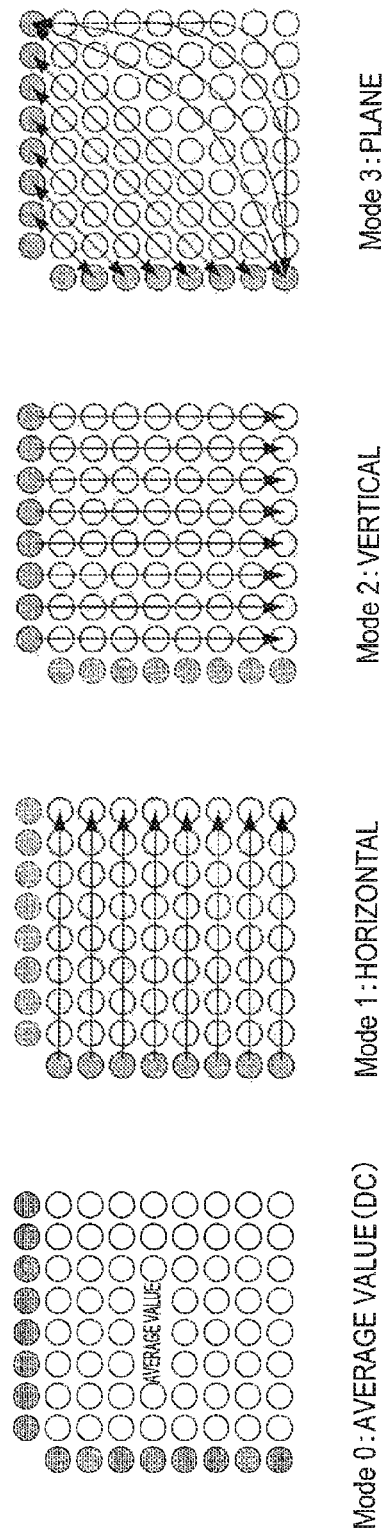

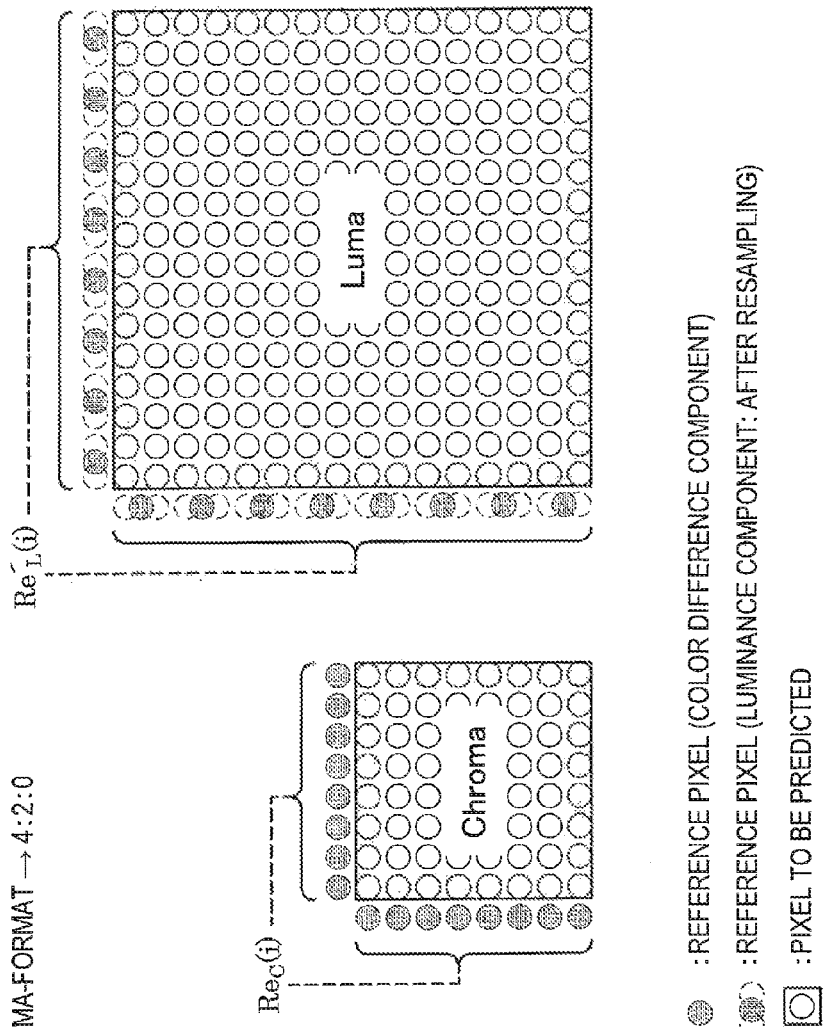

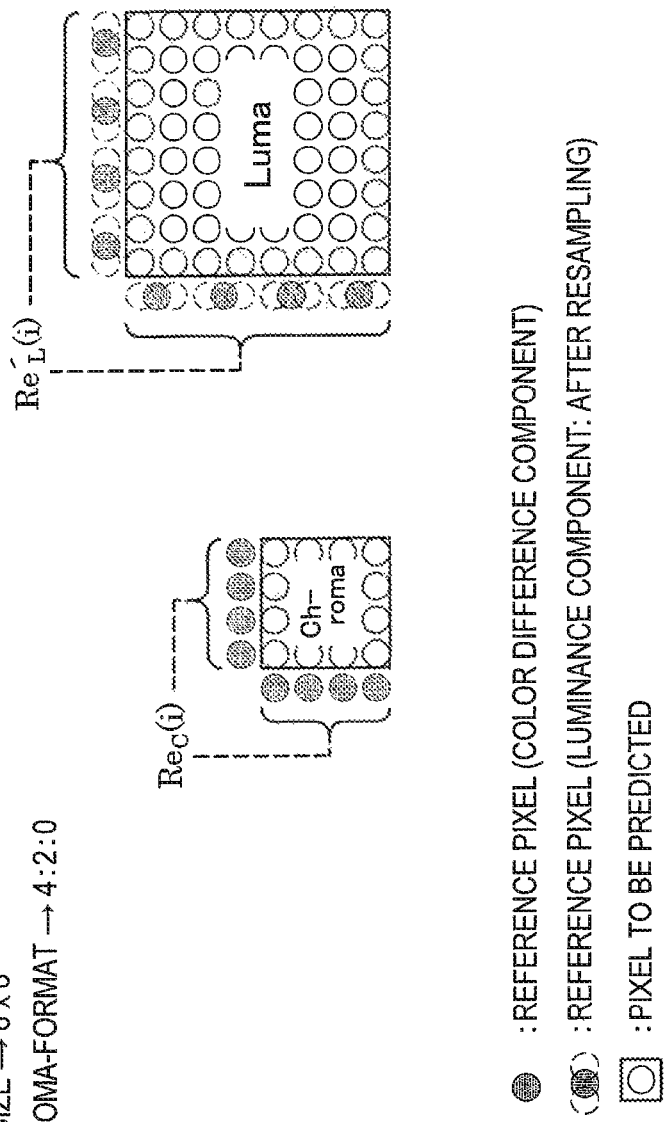

FIG. 10

| PU SIZE | REFERENCE RATIO | CHROMA-FORMAT | | | NUMBER OF REFERENCE PIXELS ($lv + lh = l$) |
|---|---|---|---|---|---|
| | | 4:2:0 | 4:2:2 | 4:4:4 | |
| 4×4 | 1:1 | 2+2=4 | 4+2=6 | 4+4=8 | |
| 8×8 | 1:1 | 4+4=8 | 8+4=12 | 8+8=16 | |
| 16×16 | 2:1 | | | | |
| 32×32 | 4:1 | | | | |

FIG. 11A
~SCENARIO 1-1~
- PU SIZE → 16 x 16
- CHROMA-FORMAT → 4:2:0
- REFERENCE RATIO → 2:1
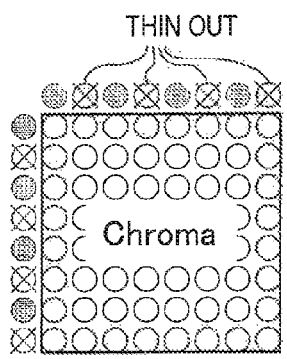
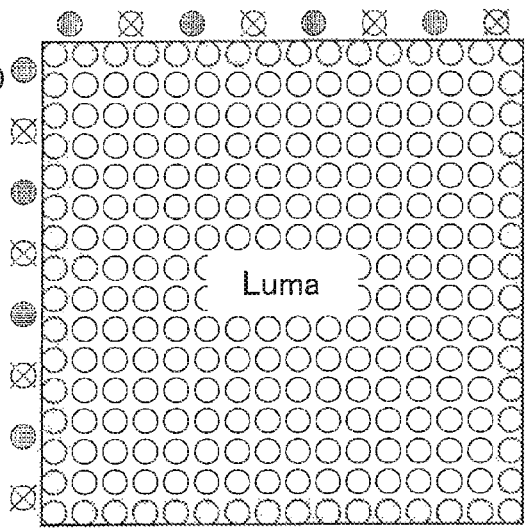
NUMBER OF REFERENCE PIXELS  $I_C = I_L = 8/2 + 8/2 = 8$
FIG. 11B
~SCENARIO 1-2~
- PU SIZE → 32 x 32
- CHROMA-FORMAT → 4:2:0
- REFERENCE RATIO → 4:1
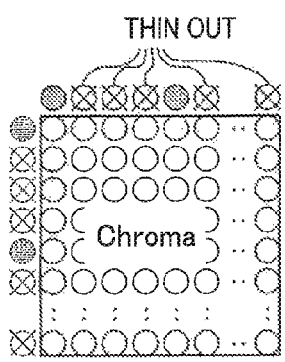
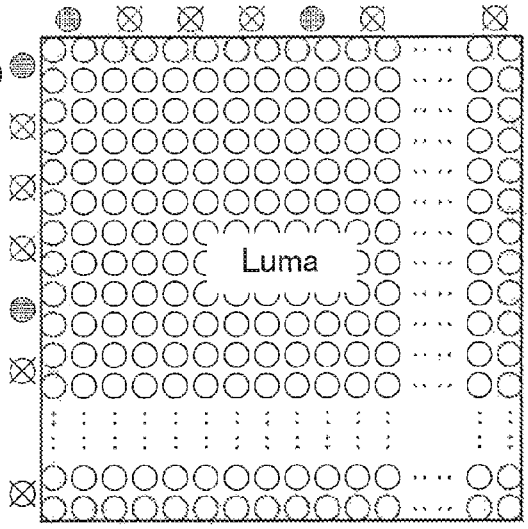
NUMBER OF REFERENCE PIXELS  $I_C = I_L = 16/4 + 16/4 = 8$

FIG. 12

| PU SIZE | CHROMA-FORMAT | DIRECTION | REFERENCE RATIO | NUMBER OF REFERENCE PIXELS ( lv + lh = 1 ) |
|---|---|---|---|---|
| 4×4 | 4:2:0 | VERTICAL | 1:1 | 2 + 2 = 4 |
| | | HORIZONTAL | | |
| | 4:2:2 | VERTICAL | 2:1 | |
| | | HORIZONTAL | 1:1 | |
| | 4:4:4 | VERTICAL | 2:1 | |
| | | HORIZONTAL | | |
| 8×8 | 4:2:0 | VERTICAL | 1:1 | 4 + 4 = 8 |
| | | HORIZONTAL | | |
| | 4:2:2 | VERTICAL | 2:1 | |
| | | HORIZONTAL | 1:1 | |
| | 4:4:4 | VERTICAL | 2:1 | |
| | | HORIZONTAL | | |
| 16×16 | 4:2:0 | VERTICAL | 2:1 | 4 + 4 = 8 |
| | | HORIZONTAL | | |
| | 4:2:2 | VERTICAL | 4:1 | |
| | | HORIZONTAL | 2:1 | |
| | 4:4:4 | VERTICAL | 4:1 | |
| | | HORIZONTAL | | |
| 32×32 | 4:2:0 | VERTICAL | 4:1 | 4 + 4 = 8 |
| | | HORIZONTAL | | |
| | 4:2:2 | VERTICAL | 8:1 | |
| | | HORIZONTAL | 4:1 | |
| | 4:4:4 | VERTICAL | 8:1 | |
| | | HORIZONTAL | | |

FIG. 13A
~SCENARIO 2-1~
- PU SIZE → 8 × 8
- CHROMA-FORMAT → 4:2:0
- REFERENCE RATIO
  - VERTICAL → 1:1
  - HORIZONTAL → 1:1
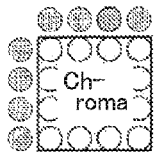
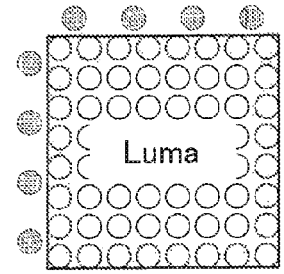
NUMBER OF REFERENCE PIXELS    $I_C = I_L = 4 + 4 = 8$
FIG. 13B
~SCENARIO 2-2~
- PU SIZE → 8 × 8
- CHROMA-FORMAT → 4:2:2
- REFERENCE RATIO
  - VERTICAL → 2:1
  - HORIZONTAL → 1:1
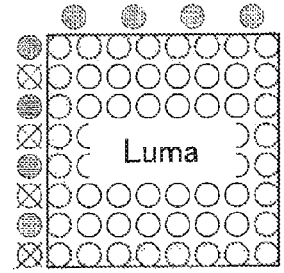
NUMBER OF REFERENCE PIXELS    $I_C = I_L = 8/2 + 4 = 8$
FIG. 13C
~SCENARIO 2-3~
- PU SIZE → 8 × 8
- CHROMA-FORMAT → 4:4:4
- REFERENCE RATIO
  - VERTICAL → 2:1
  - HORIZONTAL → 2:1
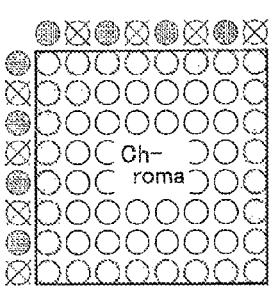
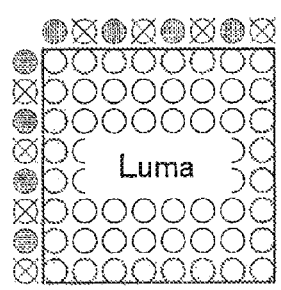
NUMBER OF REFERENCE PIXELS    $I_C = I_L = 8/2 + 8/2 = 8$ ~SCENARIO 2-4~
- PU SIZE → 16 × 16
- CHROMA-FORMAT → 4:2:0
- REFERENCE RATIO
  VERTICAL → 2:1
  HORIZONTAL → 2:1

NUMBER OF REFERENCE PIXELS $I_C = I_L = 8/2 + 8/2 = 8$

FIG. 14

| PU SIZE | REFERENCE RATIO | | CHROMA-FORMAT | | | NUMBER OF REFERENCE PIXELS ($l_v + l_h = l$) |
| --- | --- | --- | --- | --- | --- | --- |
| | V | H | 4:2:0 | 4:2:2 | 4:4:4 | |
| 4×4 | 1:1 | 1:1 | 2 + 2 = 4 | 4 + 2 = 6 | 4 + 4 = 8 | |
| 8×8 | 2:1 | 1:1 | 2 + 4 = 6 | 4 + 4 = 8 | 4 + 8 = 12 | |
| 16×16 | 4:1 | 1:1 | 2 + 8 = 10 | 4 + 8 = 12 | 4 + 16 = 20 | |
| 32×32 | 8:1 | 2:1 | | | | |

FIG. 15A
~SCENARIO 3-1~
- PU SIZE → 8 x 8
- CHROMA-FORMAT → 4:2:0
- REFERENCE RATIO
  - VERTICAL → 2:1
  - HORIZONTAL → 1:1
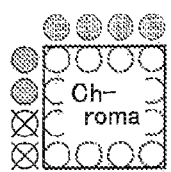
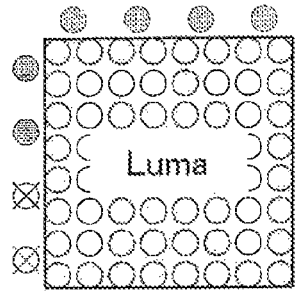
NUMBER OF REFERENCE PIXELS $\quad I_C = I_L = 4/2 + 4 = 6$
FIG. 15B
~SCENARIO 3-2~
- PU SIZE → 16 x 16
- CHROMA-FORMAT → 4:2:0
- REFERENCE RATIO
  - VERTICAL → 4:1
  - HORIZONTAL → 1:1
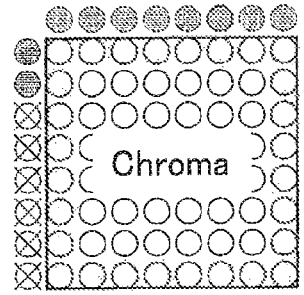
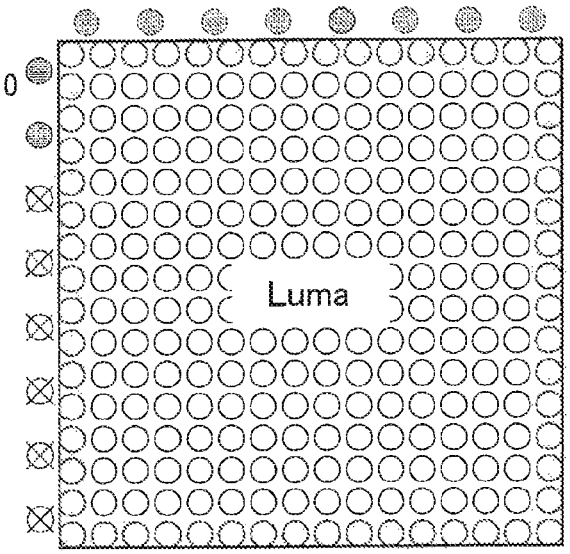
NUMBER OF REFERENCE PIXELS $\quad I_C = I_L = 8/4 + 8 = 10$

FIG. 16

| CAPABILITIES | PU SIZE | REFERENCE RATIO | CHROMA-FORMAT | | |
|---|---|---|---|---|---|
| | | | 4:2:0 | 4:2:2 | 4:4:4 |
| HIGH | 4×4 | 1:1 | 2+2=4 | 4+2=6 | 4+4=8 |
| | 8×8 | 1:1 | 4+4=8 | 8+4=12 | 8+8=16 |
| | 16×16 | 2:1 | | | |
| | 32×32 | 4:1 | | | |
| LOW | 4×4 | 1:1 | 2+2=4 | 4+2=6 | 4+4=8 |
| | 8×8 | 2:1 | | | |
| | 16×16 | 4:1 | | | |
| | 32×32 | 8:1 | | | |

NUMBER OF REFERENCE PIXELS ( $lv + lh = l$ )

FIG. 17A
~SCENARIO 4-1~
- PU SIZE → 16 x 16
- CHROMA-FORMAT → 4:2:0
- CAPABILITIES → HIGH
- REFERENCE RATIO → 2:1
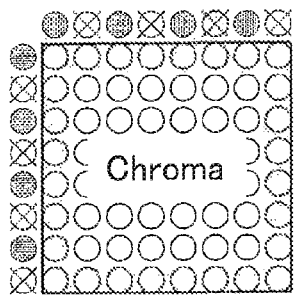
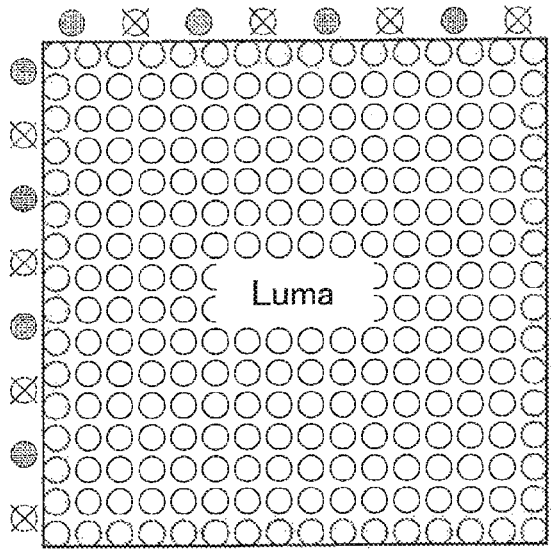
NUMBER OF REFERENCE PIXELS   $I_C = I_L = 8/2 + 8/2 = 8$
FIG. 17B
~SCENARIO 4-2~
- PU SIZE → 16 x 16
- CHROMA-FORMAT → 4:2:0
- CAPABILITIES → LOW
- REFERENCE RATIO → 4:1
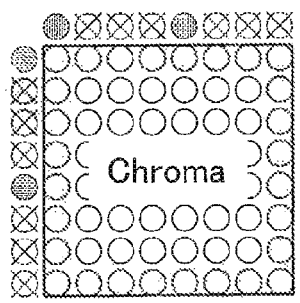
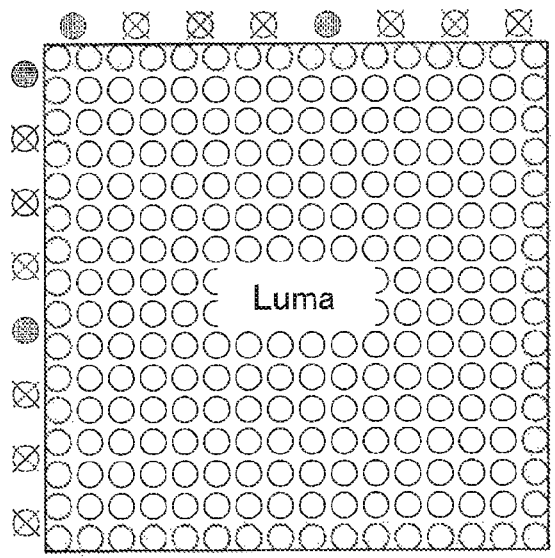
NUMBER OF REFERENCE PIXELS   $I_C = I_L = 8/4 + 8/4 = 4$

FIG. 18A
~SCENARIO 5-1~
- PU SIZE → 2 x 8
- CHROMA-FORMAT → 4:2:0
- REFERENCE RATIO
  - VERTICAL → 1:1
  - HORIZONTAL → 2:1
Chroma 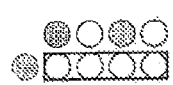  Luma 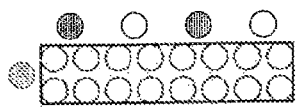
NUMBER OF REFERENCE PIXELS  $I_C = I_L = 1 + 4/2 = 3$
FIG. 18B
~SCENARIO 5-2~
- PU SIZE → 16 x 4
- CHROMA-FORMAT → 4:2:0
- REFERENCE RATIO
  - VERTICAL → 4:1
  - HORIZONTAL → 1:1
Chroma 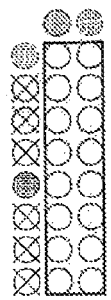  Luma 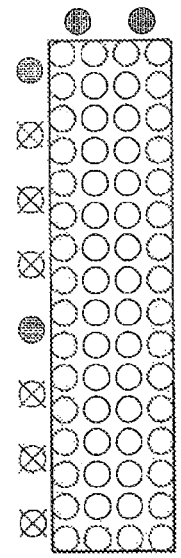
NUMBER OF REFERENCE PIXELS  $I_C = I_L = 8/4 + 2 = 4$

FIG. 27A
- PU SIZE → 16 x 16
- CHROMA-FORMAT → 4:2:0
- THINNING RATE → 25%
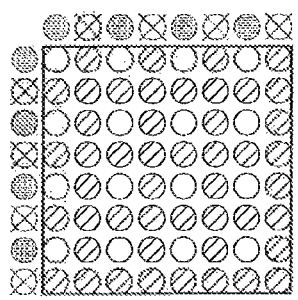
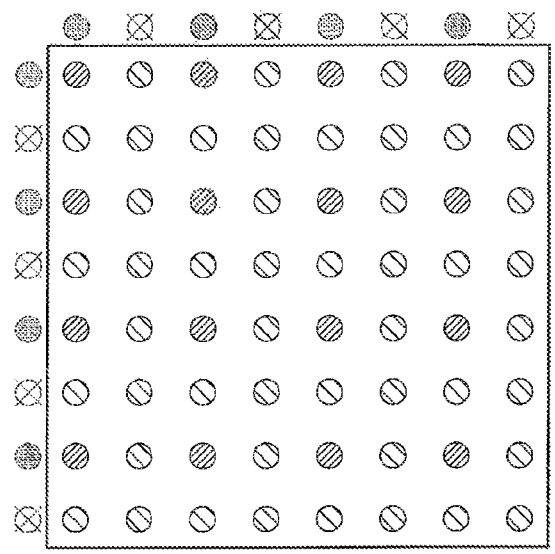
◯ : Excluded Luma Component
⊠ : Excluded Reference Luma Component
FIG. 27B
- PU SIZE → 16 x 16
- CHROMA-FORMAT → 4:2:0
- THINNING RATE → 50%
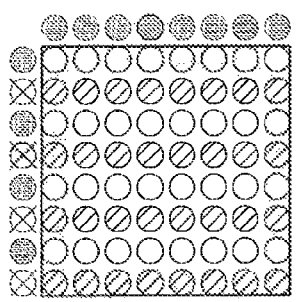
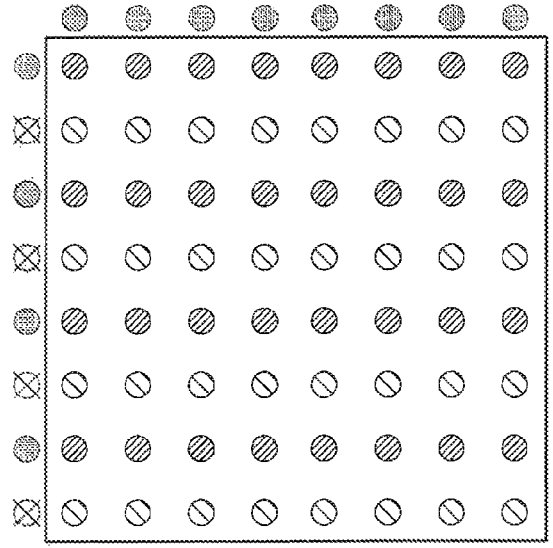
◯ : Excluded Luma Component
⊠ : Excluded Reference Luma Component

IMAGE PROCESSING DEVICE AND IMAGE PROCESSING METHOD FOR ENCODING A BLOCK OF AN IMAGE

CROSS REFERENCE TO PRIOR APPLICATION

This application is a continuation of U.S. patent application Ser. No. 14/003,253 (filed on Sep. 5, 2013), which is a National Stage Patent Application of PCT International Patent Application No. PCT/JP2012/059168 (filed on Apr. 4, 2012) under 35 U.S.C. §371, which claims priority to Japanese Patent Application Nos. 2011-210542 (filed on Sep. 27, 2011), 2011-145411 (filed on Jun. 30, 2011), and 2011-125473 (filed on Jun. 3, 2011), which are all hereby incorporated by reference in their entirety.

TECHNICAL FIELD

The present disclosure relates to an image processing device, and an image processing method.

BACKGROUND ART

Conventionally, a compression technology is widespread that has its object to effectively transmit or accumulate digital images, and that compresses the amount of information of an image by motion compensation and orthogonal transform such as discrete cosine transform, for example, by using redundancy unique to the image. For example, an image encoding device and an image decoding device conforming to a standard technology such as H.26x standards developed by ITU-T or MPEG-y standards developed by MPEG (Moving Picture Experts Group) are widely used in various scenes, such as accumulation and distribution of images by a broadcaster and reception and accumulation of images by a general user.

The H.26x standards (ITU-T Q6/16 VCEG) are standards developed initially with the aim of performing encoding that is suitable for communications such as video telephones and video conferences. The H.26x standards are known to require a large computation amount for encoding and decoding, but to be capable of realizing a higher compression ratio, compared with the MPEG-y standards. Furthermore, with Joint Model of Enhanced-Compression Video Coding, which is a part of the activities of MPEG4, a standard allowing realization of a higher compression ratio by adopting a new function while being based on the H.26x standards is developed. This standard was made an international standard under the names of H.264 and MPEG-4 Part10 (Advanced Video Coding; AVC) in March 2003.

One important technique in the image encoding method describe above is in-screen prediction, that is, intra prediction. Intra prediction is a technique of using a correlation between adjacent blocks in an image and predicting the pixel value of a certain block from the pixel value of another block that is adjacent to thereby reduce the amount of information to be encoded. With an image encoding method before MPEG4, only the DC component and the low frequency component of an orthogonal transform coefficient were the targets of intra prediction, but with H.264/AVC, intra prediction is possible for all the pixel values. By using intra prediction, a significant increase in the compression ratio can be expected for an image where the change in the pixel value is gradual, such as an image of the blue sky, for example.

In H.264/AVC, the intra prediction can be made using a block of, for example, 4×4 pixels, 8×8 pixels, or 16×16 pixels as a processing unit (that is, a prediction unit (PU)). In HEVC (High Efficiency Video Coding) whose standardization is under way as a next-generation image encoding scheme subsequent to H.264/AVC, the size of the prediction unit is about to be extended to 32×32 pixels and 64×64 pixels (see Non-Patent Literature 1).

To make an intra prediction, the optimum prediction mode to predict a pixel value of a block to be predicted is normally selected from a plurality of prediction modes. The prediction mode is typically distinguished by the prediction direction from a reference pixel to a pixel to be predicted. In H.264/AVC, for example, when predicting a color difference component, four prediction modes of the average value prediction, horizontal prediction, vertical prediction, and plane prediction can be selected. Further, in HEVC, an additional prediction mode called a linear model (LM) mode that predicts the pixel value of a color difference component using a linear function of a dynamically built luminance component as a prediction function is proposed (see Non-Patent Literature 2).

CITATION LIST

Non-Patent Literature

Non-Patent Literature 1: Sung-Chang Lim, Hahyun Lee, Jinho Lee, Jongho Kim, Haechul Choi, Seyoon Jeong, Jin Soo Choi, "Intra coding using extended block size" (VCEG-AL28, July 2009)

Non-Patent Literature 2: Jianle Chen, et al. "CE6.a.4: Chroma intra prediction by reconstructed luma samples" (JCTVC-E266, March, 2011)

SUMMARY OF INVENTION

Technical Problem

According to the technique described in Non-Patent Literature 2 described above, however, the processing cost needed to build a prediction function in LM mode increases with an increasing number of reference pixels. Thus, in HEVC in which the size of the prediction unit is extended up to 64×64 pixels, the increasing processing cost through the adoption of the LM mode could degrade performance of encoding and decoding.

Therefore, when, like the LM mode, the intra prediction based on a dynamically built prediction function is made, it is desirable that a technique capable of avoiding or mitigating an increase in processing cost needed to build a prediction function be provided.

Solution to Problem

According to the present disclosure, there is provided an image processing apparatus including a prediction section that generates a predicted value of a color difference component of a pixel of an image to be decoded by using a function of a value of a corresponding luminance component, a coefficient calculation section that calculates a coefficient of the function used by the prediction section by referencing a pixel around a block to which the pixel belongs, and a controller that controls a ratio of a number of reference pixels used by the coefficient calculation section to a block size of the block.

The image processing device mentioned above may be typically realized as an image decoding device that decodes an image.

Further, according to an embodiment of the present disclosure, there is provided an image processing method including generating a predicted value of a color difference component of a pixel of an image to be decoded by using a function of a value of a corresponding luminance component, calculating a coefficient of the function by referencing a pixel around a block to which the pixel belongs, and controlling a ratio of a number of reference pixels used for calculating the coefficient to a block size of the block.

Further, according to an embodiment of the present disclosure, there is provided an image processing apparatus including a prediction section that generates a predicted value of a color difference component of a pixel of an image to be encoded by using a function of a value of a corresponding luminance component, a coefficient calculation section that calculates a coefficient of the function used by the prediction section by referencing a pixel around a block to which the pixel belongs, and a controller that controls a ratio of a number of reference pixels used by the coefficient calculation section to a block size of the block.

The image processing device mentioned above may be typically realized as an image encoding device that encodes an image.

Further, according to an embodiment of the present disclosure, there is provided an image processing method including generating a predicted value of a color difference component of a pixel of an image to be encoded by using a function of a value of a corresponding luminance component, calculating a coefficient of the function by referencing a pixel around a block to which the pixel belongs, and controlling a ratio of a number of reference pixels used for calculating the coefficient to a block size of the block.

Further, according to an embodiment of the present disclosure, there is provided an image processing apparatus including a prediction section that makes an intra prediction of a color difference component of an image using a luminance component of the image to be decoded, and a controller that variably controls a reference pixel referenced when the intra prediction is made by the prediction section.

The image processing apparatus may be realized as an image encoding device that encodes images or as an image decoding device that decodes images.

Further, according to an embodiment of the present disclosure, there is provided an image processing method including making an intra prediction of a color difference component of an image using a luminance component of the image to be decoded, and variably controlling a reference pixel referenced when the intra prediction of the color difference component is made.

Advantageous Effects of Invention

According to the technology in the present disclosure, when the intra prediction based on a dynamically built prediction function is made, an increase in processing cost needed to build a prediction function can be avoided or mitigated.

BRIEF DESCRIPTION OF DRAWINGS

FIG. 7 is an explanatory view illustrating examples of prediction mode candidates for a luminance component of a prediction unit of 16×16 pixels.

FIG. 8 is an explanatory view illustrating examples of prediction mode candidates for a color difference component.

FIG. 9A is a first explanatory view illustrating reference pixels in LM mode.

FIG. 9B is a second explanatory view illustrating reference pixels in LM mode.

FIG. 10 is an explanatory view showing an example of the definition of a reference ratio in a first scenario.

FIG. 11A is an explanatory view showing a first example of the number of reference pixels controlled according to the first scenario.

FIG. 11B is an explanatory view showing a second example of the number of reference pixels controlled according to the first scenario.

FIG. 12 is an explanatory view showing an example of the definition of a reference ratio in a second scenario.

FIG. 13A is an explanatory view showing a first example of the number of reference pixels controlled according to the second scenario.

FIG. 13B is an explanatory view showing a second example of the number of reference pixels controlled according to the second scenario.

FIG. 13C is an explanatory view showing a third example of the number of reference pixels controlled according to the second scenario.

FIG. 14 is an explanatory view showing an example of the definition of a reference ratio in a third scenario.

FIG. 15A is an explanatory view showing a first example of the number of reference pixels controlled according to the third scenario.

FIG. 15B is an explanatory view showing a second example of the number of reference pixels controlled according to the third scenario.

FIG. 16 is an explanatory view showing an example of the definition of a reference ratio in a fourth scenario.

FIG. 17A is an explanatory view showing a first example of the number of reference pixels controlled according to the fourth scenario.

FIG. 17B is an explanatory view showing a second example of the number of reference pixels controlled according to the fourth scenario.

FIG. 18A is an explanatory view showing a first example of the number of reference pixels controlled according to a fifth scenario.

FIG. 18B is an explanatory view showing a second example of the number of reference pixels controlled according to the fifth scenario.

FIG. 27A is an explanatory view illustrating a first example of correspondence between thinning positions of reference pixels and thinning positions of luminance components.

FIG. 27B is an explanatory view illustrating a second example of correspondence between thinning positions of reference pixels and thinning positions of luminance components.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Furthermore, the "Description of Embodiments" will be described in the order mentioned below.

1. Example Configuration of Image Encoding Device According to an Embodiment
2. Flow of Process at the Time of Encoding According to an Embodiment
3. Example Configuration of Image Decoding Device According to an Embodiment
4. Flow of Process at the Time of Decoding According to an Embodiment
5. Modifications
6. Example Application
7 Summary <1. Example Configuration of Image Encoding Device According to an Embodiment>

[1-1. Example of Overall Configuration]

Figure 1:
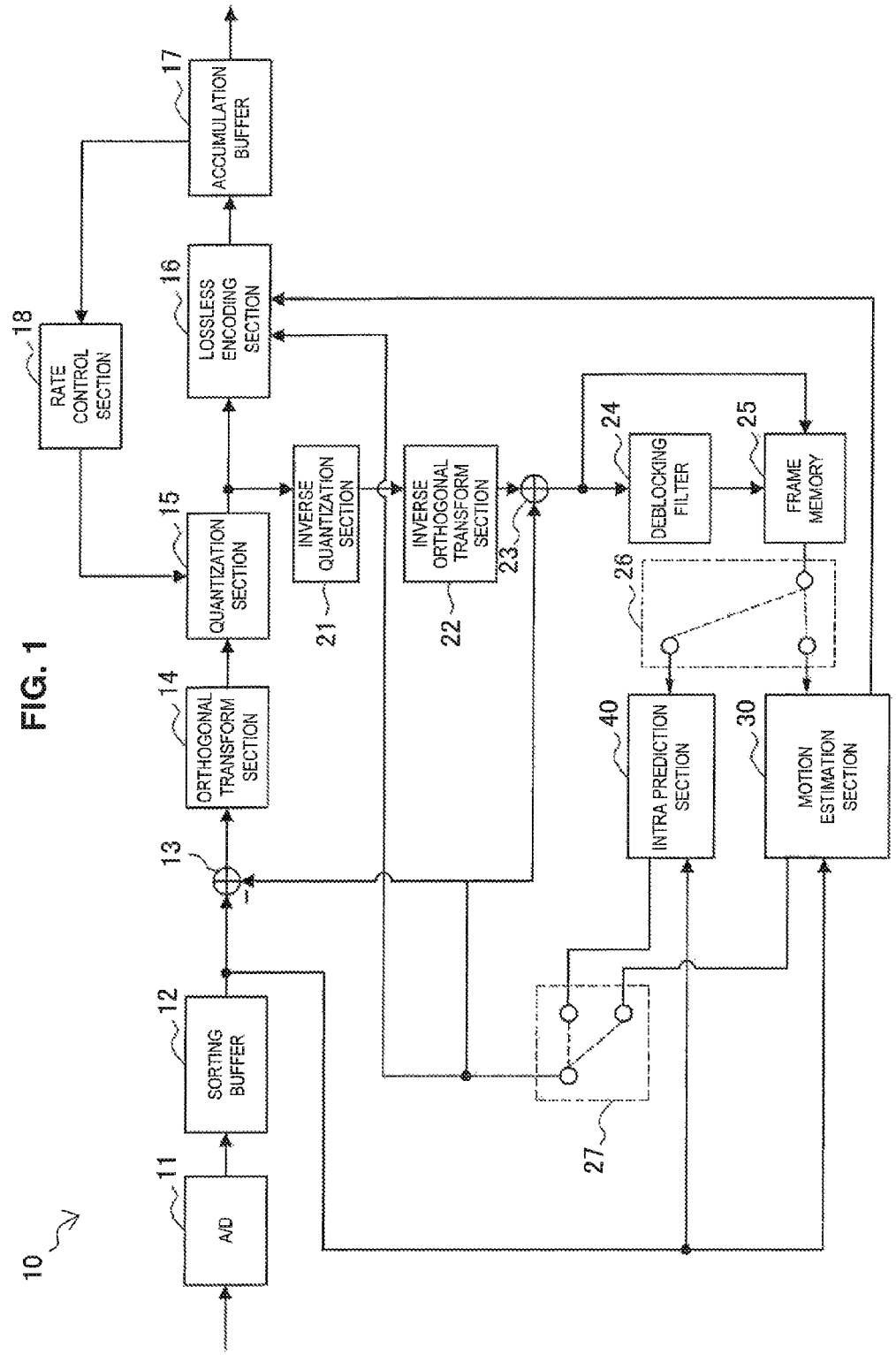
FIG. 1 is a block diagram showing an example of a configuration of an image encoding device according to an embodiment.

FIG. 1 is a block diagram showing an example of a configuration of an image encoding device 10 according to an embodiment. Referring to FIG. 1, the image encoding device 10 includes an A/D (Analogue to Digital) conversion section 11, a sorting buffer 12, a subtraction section 13, an orthogonal transform section 14, a quantization section 15, a lossless encoding section 16, an accumulation buffer 17, a rate control section 18, an inverse quantization section 21, an inverse orthogonal transform section 22, an addition section 23, a deblocking filter 24, a frame memory 25, selectors 26 and 27, a motion estimation section 30 and an intra prediction section 40.

The A/D conversion section 11 converts an image signal input in an analogue format into image data in a digital format, and outputs a series of digital image data to the sorting buffer 12.

The sorting buffer 12 sorts the images included in the series of image data input from the A/D conversion section 11. After sorting the images according to the a GOP (Group of Pictures) structure according to the encoding process, the sorting buffer 12 outputs the image data which has been sorted to the subtraction section 13, the motion estimation section 30 and the intra prediction section 40.

The image data input from the sorting buffer 12 and predicted image data input by the motion estimation section 30 or the intra prediction section 40 described later are supplied to the subtraction section 13. The subtraction section 13 calculates predicted error data which is a difference between the image data input from the sorting buffer 12 and the predicted image data and outputs the calculated predicted error data to the orthogonal transform section 14.

The orthogonal transform section 14 performs orthogonal transform on the predicted error data input from the subtraction section 13. The orthogonal transform to be performed by the orthogonal transform section 14 may be discrete cosine transform (DCT) or Karhunen-Loeve transform, for example. The orthogonal transform section 14 outputs transform coefficient data acquired by the orthogonal transform process to the quantization section 15.

The transform coefficient data input from the orthogonal transform section 14 and a rate control signal from the rate control section 18 described later are supplied to the quantization section 15. The quantization section 15 quantizes the transform coefficient data, and outputs the transform coefficient data which has been quantized (hereinafter, referred to as quantized data) to the lossless encoding section 16 and the inverse quantization section 21. Also, the quantization section 15 switches a quantization parameter (a quantization scale) based on the rate control signal from the rate control section 18 to thereby change the bit rate of the quantized data to be input to the lossless encoding section 16.

The lossless encoding section 16 generates an encoded stream by performing lossless encoding processing on quantized data input from the quantization section 15. Lossless encoding by the lossless encoding section 16 may be, for example, variable-length encoding or arithmetic encoding. Also, the lossless encoding section 16 multiplexes information on an intra prediction or information on an inter prediction input from the selector 27 into a header region of the encoded stream. Then, the lossless encoding section 16 outputs the generated encoded stream to the accumulation buffer 17.

The accumulation buffer 17 temporarily stores an encoded stream input from the lossless encoding section 16 using a storage medium such as a semiconductor memory. Then, the accumulation buffer 17 outputs accumulated encoded streams to a transmission section (not shown) (for example, a communication interface or a connection interface to a peripheral device) at a rate in accordance with the band of the transmission line.

The rate control section 18 monitors the free space of the accumulation buffer 17. Then, the rate control section 18 generates a rate control signal according to the free space on the accumulation buffer 17, and outputs the generated rate control signal to the quantization section 15. For example, when there is not much free space on the accumulation buffer 17, the rate control section 18 generates a rate control signal for lowering the bit rate of the quantized data. Also, for example, when the free space on the accumulation buffer 17 is sufficiently large, the rate control section 18 generates a rate control signal for increasing the bit rate of the quantized data.

The inverse quantization section 21 performs an inverse quantization process on the quantized data input from the quantization section 15. Then, the inverse quantization section 21 outputs transform coefficient data acquired by the inverse quantization process to the inverse orthogonal transform section 22.

The inverse orthogonal transform section 22 performs an inverse orthogonal transform process on the transform coefficient data input from the inverse quantization section 21 to thereby restore the predicted error data. Then, the inverse orthogonal transform section 22 outputs the restored predicted error data to the addition section 23.

The addition section 23 adds the restored predicted error data input from the inverse orthogonal transform section 22 and the predicted image data input from the motion estimation section 30 or the intra prediction section 40 to thereby generate decoded image data. Then, the addition section 23 outputs the generated decoded image data to the deblocking filter 24 and the frame memory 25.

The deblocking filter 24 performs a filtering process for reducing block distortion occurring at the time of encoding of an image. The deblocking filter 24 filters the decoded image data input from the addition section 23 to remove the block distortion, and outputs the decoded image data after filtering to the frame memory 25.

The frame memory 25 stores, using a storage medium, the decoded image data input from the addition section 23 and the decoded image data after filtering input from the deblocking filter 24.

The selector 26 reads the decoded image data after filtering which is to be used for inter prediction from the frame memory 25, and supplies the decoded image data which has been read to the motion estimation section 30 as reference image data. Also, the selector 26 reads the decoded image data before filtering which is to be used for intra prediction from the frame memory 25, and supplies the decoded image data which has been read to the intra prediction section 40 as reference image data.

In the inter prediction mode, the selector 27 outputs predicted image data which is a result of inter prediction output from the motion estimation section 30 to the subtraction section 13, and also, outputs the information about inter prediction to the lossless encoding section 16. Furthermore, in the intra prediction mode, the selector 27 outputs predicted image data which is a result of intra prediction output from the intra prediction section 40 to the subtraction section 13, and also, outputs the information about intra prediction to the lossless encoding section 16. The selector 27 switches between the inter prediction mode and the intra prediction mode depending on the size of a cost function output from the motion estimation section 30 or the intra prediction section 40.

The motion estimation section 30 performs inter prediction processing (inter-frame prediction processing) based on image data (original image data) to be encoded and input from the reordering buffer 12 and decoded image data supplied via the selector 26. For example, the motion estimation section 30 evaluates prediction results by each prediction mode using a predetermined cost function. Next, the motion estimation section 30 selects the prediction mode that produces the minimum cost function value, that is, the prediction mode that produces the highest compression ratio as the optimum prediction mode. Also, the motion estimation section 30 generates predicted image data according to the optimum prediction mode. Then, the motion estimation section 30 outputs prediction mode information indicating the selected optimum prediction mode, information on inter predictions including motion vector information and reference image information, the cost function value, and predicted image data to the selector 27.

The intra prediction section 40 performs intra prediction processing on each block set inside an image based on original image data input from the reordering buffer 12 and decoded image data as reference image data supplied from the memory frame 25. Then, the intra prediction section 40 outputs information on intra predictions, including prediction mode information indicating the optimum prediction mode and size related information, the cost function value, and predicted image data to the selector 27. Prediction modes that can be selected by the intra prediction section 40 include, in addition to existing intra prediction modes, a linear model (LM) mode about the color difference component. In contrast to the LM mode described in Non-Patent Literature 2 described above, the LM mode in the present embodiment is characterized in that the ratio of the number of reference pixels to the block size can change. The intra prediction processing by the intra prediction section 40 will be described later in detail.

[1-2. Configuration Example of Intra Prediction Section]

Figure 2:
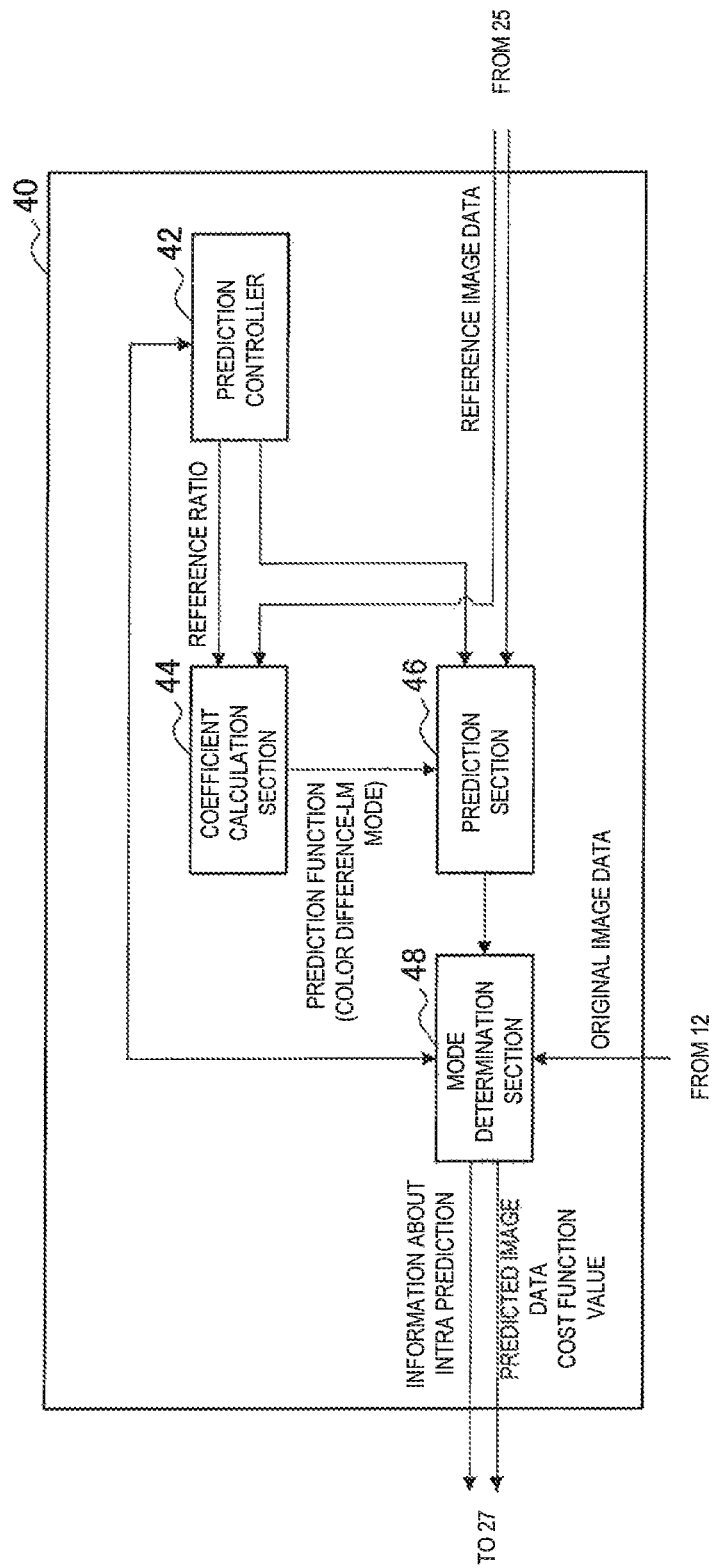
FIG. 2 is a block diagram showing an example of a detailed configuration of an intra prediction section of the image encoding device of the embodiment.

FIG. 2 is a block diagram showing an example of a detailed configuration of the intra prediction section 40 of an image encoding device 10 shown in FIG. 1. Referring to FIG. 2, the intra prediction section 40 includes a prediction controller 42, a coefficient calculation section 44, a prediction section 46, and a mode determination section 48.

The prediction controller 42 controls intra prediction processing by the intra prediction section 40. For example, the prediction controller 42 performs intra prediction processing of the luminance component (Y) and then performs intra prediction processing of color difference components (Cb, Cr) in coding units (CU). In the intra prediction processing of the luminance component, the prediction controller 42 causes the prediction section 46 to generate a predicted pixel value of each pixel in a plurality of prediction modes and causes the mode determination section 48 to determine the optimum prediction mode of the luminance component. As a result, the arrangement of prediction units in the coding unit is also decided. In the intra prediction processing of the color difference components, the prediction controller 42 causes the prediction section 46 to generate a predicted pixel value of each pixel in a plurality of prediction modes for each prediction unit and causes the mode determination section 48 to determine the optimum prediction mode of the color difference components.

Prediction mode candidates for the luminance component may be a prediction mode adopted by an existing image encoding scheme such as H.264/AVC or a different prediction mode. Prediction mode candidates for the color difference component may also contain a prediction mode adopted by an existing image encoding scheme. Further, prediction mode candidates for the color difference component contain the above-mentioned LM mode. According to the technique described in Non-Patent Literature 2 described above, the ratio of the number of reference pixels to the block size when coefficients of a prediction function in LM mode are calculated is constant. Therefore, the number of reference pixels increases correspondingly with an increasing block size. In the present embodiment, on the other hand, the prediction controller 42 controls the above ratio variably. The block size here is in principle a size of the prediction unit. The above-mentioned ration controlled by the prediction controller 42, that is, the ratio of the number of reference pixels to the block size will herein be called a "reference ratio". The control of the reference ratio by the prediction controller 42 is typically performed in accordance with the block size. Further, the prediction controller 42 may control the reference ratio in accordance with a chroma-format affecting the block size of the color difference component corresponding to the prediction unit. The prediction controller 42 may also control the reference ratio in accordance with parameters (for example, a profile or level) defining capabilities of a device for encoding and decoding images. A plurality of scenarios of controlling the reference ratio by the prediction controller 42 will be described later in more detail.

The coefficient calculation section 44 calculates coefficients of a prediction function used by the prediction section 46 in LM mode by referring to pixels around the prediction unit to which the pixel to be predicted belongs, that is, reference pixels. The prediction function used by the prediction section 46 is typically a linear function of the value of the luminance component. The number of reference pixels referenced by the coefficient calculation section 44 to calculate coefficients of a prediction function is controlled by, as described above, the prediction controller 42.

The prediction section 46 predicts the pixel value of the luminance component and the pixel value of the color difference component of a pixel to be predicted according to various prediction mode candidates under the control of the prediction controller 42. Examples of prediction mode candidates used by the prediction section 46 will be described later in more detail. Predicted image data generated as a result of prediction by the prediction section 46 is output to the mode determination section 48 for each prediction mode.

The mode determination section 48 calculates the cost function value of each prediction mode based on original image data input from the reordering buffer 12 and predicted image data input from the prediction section 46. Then, based on the calculated cost function value, the mode determination section 48 decides the optimum prediction mode for the luminance component and the arrangement of prediction units inside the coding unit. Similarly, based on the cost function value of the color difference component, the mode determination section 48 decides the optimum prediction mode for the color difference component. Then, the mode determination section 48 outputs information on intra predictions including prediction mode information indicating the decided optimum prediction mode and size related information, the cost function value, and predicted image data including predicted pixel values of the luminance component and the color difference component to the selector 27. The size related information output from the mode determination section 48 may contain, in addition to information to identify the size of each prediction unit, information specifying the chroma-format.

[1-3. Prediction Mode Candidates]

Next, prediction mode candidates that can be used by the prediction section 46 of the intra prediction section 40 will be described.

(1) Prediction Mode Candidates for the Luminance Component

Figure 3:
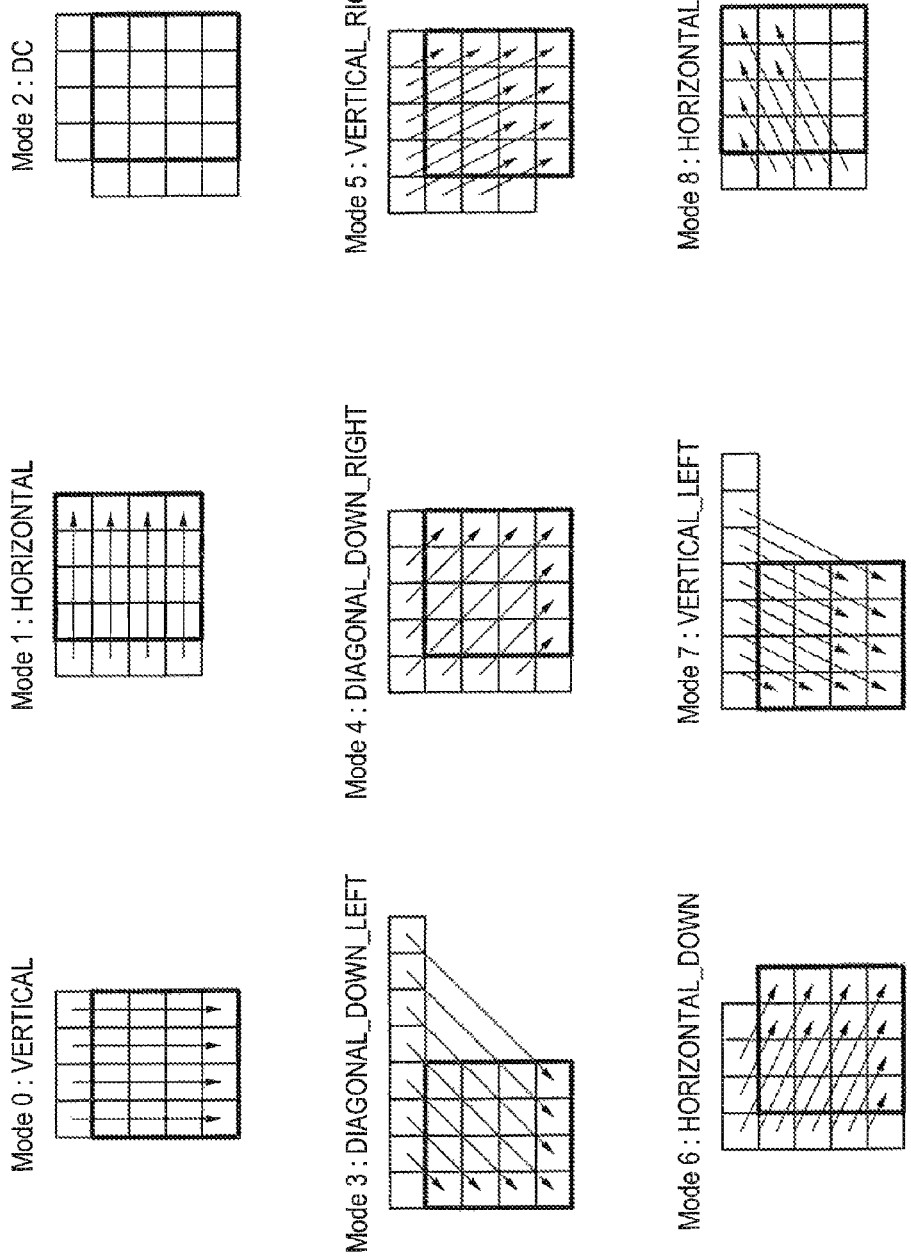
FIG. 3 is an explanatory view illustrating examples of prediction mode candidates for a luminance component of a prediction unit of 4×4 pixels.
Figures 4, 5:
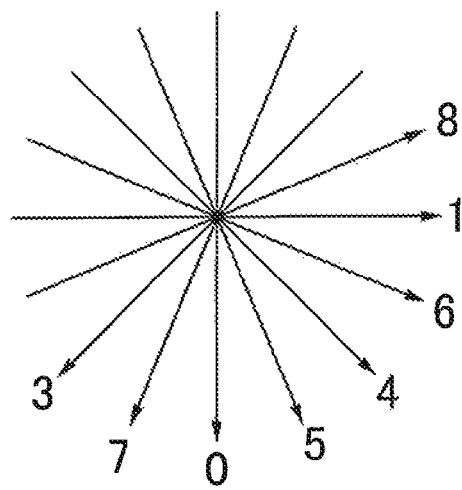
FIG. 4 is an explanatory view illustrating prediction directions related to the examples in FIG. 3.
FIG. 5 is an explanatory view illustrating reference pixels related to the examples in FIG. 3.

Prediction mode candidates for the luminance component may be a prediction mode adopted by an existing image encoding scheme such as H.264/AVC. FIGS. 3 to 5 are explanatory views illustrating such prediction mode candidates when the size of the prediction unit is 4×4 pixels.

Referring to FIG. 3, nine prediction modes (Mode 0 to Mode 8) that can be used for the prediction unit of the 4×4 pixels are shown. In FIG. 4, the prediction direction corresponding to each mode number is schematically shown. In FIG. 5, lower-case alphabetic characters a to p represent the pixel value of each pixel (that is, each pixel to be predicted) in the prediction unit of 4×4 pixels. $R_z$ ($z$=a, b, ..., m) around the prediction unit represents the pixel value of an encoded reference pixel.

For example, the prediction direction in Mode 0 is a vertical direction, and each predicted pixel value is calculated as below:

$a=e=i=m=Ra$ $b=f=j=n=Rb$ $c=g=k=o=Rc$ $d=h=l=p=Rd$

The prediction direction in Mode 1 is horizontal, and each predicted pixel value is calculated as below:

$a=b=c=d=Ri$ $e=f=g=h=Rj$ $i=j=k=l=Rk$ $m=n=o=p=Rl$

Mode 2 represents the DC prediction (average value prediction) and each predicted pixel value is calculated according to one of the following four formulas depending on which reference pixel can be used.

$a=b=\ldots=p=(Ra+Rb+Rc+Rd+Ri+Rj+Rk+Rl+4)>>3$ $a=b=\ldots=p=(Ra+Rb+Rc+Rd+2)>>2$ $a=b=\ldots=p=(Ri+Rj+Rk+Rl+2)>>2$ $a=b=\ldots=p=128$ The prediction direction in Mode 3 is diagonal down left, and each predicted pixel value is calculated as below:

$a=(Ra+2Rb+Rc+2)>>2$ $b=e=(Rb+2Rc+Rd+2)>>2$ $c=f=i=(Rc+2Rd+Re+2)>>2$ $d=g=j=m=(Rd+2Re+Rf+2)>>2$ $h=k=n=(Re+2Rf+Rg+2)>>2$ $l=o=(Rf+2Rg+Rh+2)>>2$ $p=(Rg+3Rh+2)>>2$

The prediction direction in Mode 4 is diagonal down right, and each predicted pixel value is calculated as below:

$m=(Rj+2Rk+Rl+2)>>2$ $i=n=(Ri+2Rj+Rk+2)>>2$ $e=j=o=(Rm+2Ri+Rj+2)>>2$ $a=f=k=p=(Ra+2Rm+Ri+2)>>2$ $b=g=l=(Rm+2Ra+Rb+2)>>2$ $c=h=(Ra+2Rb+Rc+2)>>2$ $d=(Rb+2Rc+Rd+2)>>2$

The prediction direction in Mode 5 is vertical right, and each predicted pixel value is calculated as below:

$a=j=(Rm+Ra+1)>>1$ $b=k=(Ra+Rb+1)>>1$ $c=l=(Rb+Rc+1)>>1$ $d=(Rc+Rd+1)>>1$ $e=n=(Ri+2Rm+Ra+2)>>2$ $f=o=(Rm+2Ra+Rb+2)>>2$ $g=p=(Ra+2Rb+Rc+2)>>2$ $h=(Rb+2Rc+Rd+2)>>2$ $i=(Rm+2Ri+Rj+2)>>2$ $m=(Ri+2Rj+Rk+2)>>2$

The prediction direction in Mode 6 is horizontal down, and each predicted pixel value is calculated as below:

$a=g=(Rm+Ri+1)>>1$ $b=h=(Ri+2Rm+Ra+2)>>2$ $c=(Rm+2Ra+Rb+2)>>2$ $d=(Ra+2Rb+Rc+2)>>2$ $e=k=(Ri+Rj+1)>>1$ $f=l=(Rm+2Ri+Rj+2)>>2$ $i=o=(Rj+Rk+1)>>1$ $j=p=(Ri+2Rj+Rk+2)>>2$ $m=(Rk+Rl+1)>>1$ $n=(Rj+2Rk+Rl+2)>>2$

The prediction direction in Mode 7 is vertical left, and each predicted pixel value is calculated as below:

$a=(Ra+Rb+1)>>1$ $b=i=(Rb+Rc+1)>>1$ $c=j=(Rc+Rd+1)>>1$ $d=k=(Rd+Re+1)>>1$ $l=(Re+Rf+1)>>1$ $e=(Ra+2Rb+Rc+2)>>2$ $f=m=(Rb+2Rc+Rd+2)>>2$ $g=n=(Rc+2Rd+Re+2)>>2$ $h=o=(Rd+2Re+Rf+2)>>2$ $p=(Re+2Rf+Rg+2)>>2$

The prediction direction in Mode 8 is horizontal up, and each predicted pixel value is calculated as below:

$a=(Ri+Rj+1)>>1$ $b=(Ri+2Rj+Rk+2)>>2$ $c=e=(Rj+Rk+1)>>1$ $d=f=(Rj+2Rk+Rl+2)>>2$ $g=i=(Rk+Rl+1)>>1$ $h=j=(Rk+3Rl+2)>>2$ $k=l=m=n=o=p=Rl$

Figure 6:
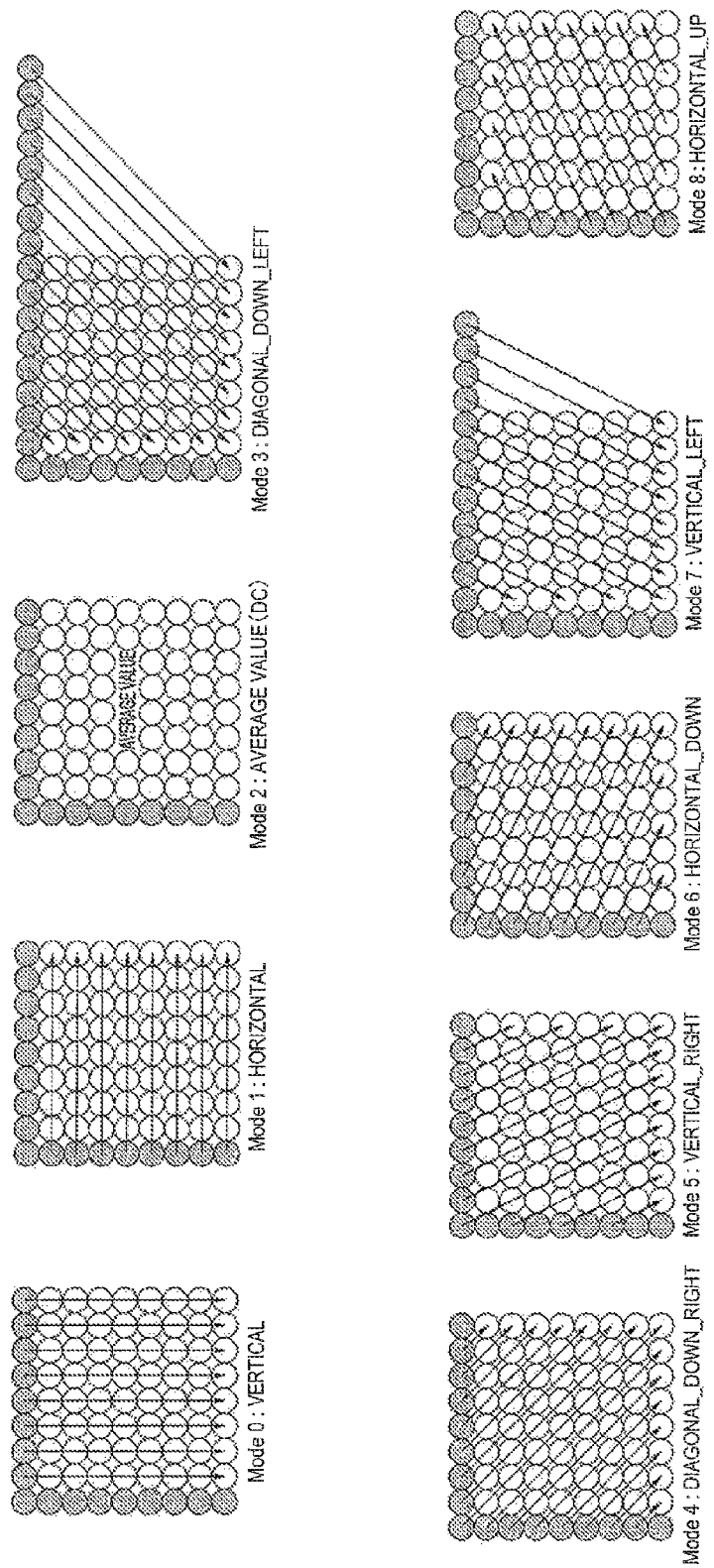
FIG. 6 is an explanatory view illustrating examples of prediction mode candidates for a luminance component of a prediction unit of 8×8 pixels.

Referring to FIG. 6, nine prediction modes (Mode 0 to Mode 8) that can be used for the prediction unit of the 8×8 pixels are shown. The prediction direction in Mode 0 is vertical. The prediction direction in Mode 1 is horizontal. Mode 2 represents the DC prediction (average value prediction). The prediction direction in Mode 3 is DIAGONAL_DOWN_LEFT. The prediction direction in Mode 4 is DIAGONAL_DOWN_RIGHT. The prediction direction in Mode 5 is VERTICAL_RIGHT. The prediction direction in Mode 6 is HORIZONTAL_DOWN. The prediction direction in Mode 7 is VERTICAL_LEFT. The prediction direction in Mode 8 is HORIZONTAL_UP.

Referring to FIG. 7, four prediction modes (Mode 0 to Mode 3) that can be used for the prediction unit of the 16×16 pixels are shown. The prediction direction in Mode 0 is vertical. The prediction direction in Mode 1 is horizontal. Mode 2 represents the DC prediction (average value prediction). Mode 3 represents the plane prediction.

(2) Prediction Mode Candidates for the Color Difference Component

The prediction mode for the color difference component can be selected independently of the prediction mode for the luminance component. In FIG. 8, among prediction mode candidates that can be used when the block size of the color difference component is 8×8 pixels, four prediction modes (Mode 0 to Mode 3) adopted for existing image encoding schemes such as H.264/AVC are shown.

Mode 0 represents the DC prediction (average value prediction). Here, the predicted pixel value of the pixel position (x, y) is represented as $Pr_C(x, y)$, eight left reference pixel values are represented as $Re_C(-1, n)$, and eight upper reference pixel values are represented as $Re_C(n, -1)$. C as a subscript means the color difference component. n is an integer equal to 0 or more and equal to 7 or less. Then, the predicted pixel value $Pr_C(x, y)$ is calculated according to one of the following three formulas depending on which reference pixels are available:

$$Pr_C[x, y] = \left(\sum_{n=0}^{7}(Re_C[-1, n] + Re_C[n, -1]) + 8\right) >> 4 \quad \text{[Math 1]}$$

-continued $$Pr_C[x, y] = \left(\sum_{n=0}^{7} Re_C[-1, n] + 4\right) >> 3$$

$$Pr_C[x, y] = \left(\sum_{n=0}^{7} Re_C[n, -1] + 4\right) >> 3$$

The prediction direction in Mode 1 is horizontal, and the predicted pixel value $Pr_C(x, y)$ is calculated as below:

$$Pr_C[x, y] = Re_C[-1, y] \qquad \text{[Math 2]}$$

The prediction direction in Mode 2 is vertical, and the predicted pixel value $Pr_C(x, y)$ is calculated as below:

$$Pr_C[x, y] = Re_C[x, -1] \qquad \text{[Math 3]}$$

Mode 3 represents the plane prediction. The predicted pixel value $Pr_C(x, y)$ is calculated as below:

[Math 4]

$$Pr_C[x, y] = \text{Clip1}(a + b \cdot (x - 3) + c \cdot (y - 3) + 16) >> 5$$

$$a = 16 \cdot (Re_C[-1, 7] + Re_C[7, -1])$$

$$b = (17 \cdot H + 16) >> 5$$

$$c = (17 \cdot V + 16) >> 5$$

$$H = \sum_{x=1}^{4} x \cdot (Re_C[3 + x, -1] - Re_C[3 - x, -1])$$

$$V = \sum_{y=1}^{4} y \cdot (Re_C[-1, 3 + y] - Re_C[-1, 3 - y])$$

Further, in the present embodiment, the LM mode (as Mode 4, for example) that will be described in the next section can be selected.

[1-4. Details of LM Mode]

In LM mode, the predicted pixel value for the color difference component is calculated by using a linear function of the value of the corresponding luminance component. For example, the prediction function used in LM mode may be the following linear function described in Non-Patent Literature 2:

[Math 5]

$$Pr_C[x, y] = \alpha \cdot Re_L'[x, y] + \beta \qquad (1)$$

In Formula (1), $Re_L'(x, y)$ represents the value of the pixel position (x, y) after resampling of the luminance components of a decoded image (so-called reconstructed image). Instead of a decoded image, an original image is used for image encoding. The luminance components are resampled when the resolution of the color difference component is different from the resolution of the luminance component depending on the chroma-format. If, for example, the chroma-format is 4:2:0, the luminance components are resampled according to the following formula in such a way that the number of pixels is reduced by half in both the horizontal direction and the vertical direction. $Re_L(u, v)$ represents the value of the luminance component in the pixel position (u, v) before resampling.

[Math 6]

$$Re_L'[x, y] = (Re_L[2x, 2y] + Re_L[2x, 2y+1]) >> 1 \qquad (2)$$

If the chroma-format is 4:2:2, the luminance components are resampled in such a way that the number of pixels is reduced by half in the horizontal direction. If the chroma-format is 4:4:4, the luminance components are not resampled.

The coefficient α in Formula (1) is calculated according to the following formula (3). Also, the coefficient β in Formula (1) is calculated according to the following formula (4).

[Math 7]

$$\alpha = \frac{I \cdot \sum_{i=0}^{I} Re_C(i) \cdot Re_L'(i) - \sum_{i=0}^{I} Re_C(i) \cdot \sum_{i=0}^{I} Re_L'(i)}{I \cdot \sum_{i=0}^{I} Re_L'(i) \cdot Re_L'(i) - \left(\sum_{i=0}^{I} Re_L'(i)\right)^2} \qquad (3)$$

$$\beta = \frac{\sum_{i=0}^{I} Re_C(i) - \alpha \cdot \sum_{i=0}^{I} Re_L'(i)}{I} \qquad (4)$$

In Formulas (3) and (4), I represents the number of reference pixels. If, for example, the block size of the color difference component is 8×8 pixels and eight left reference pixels and eight upper reference pixels are both available, I is calculated as I=8+8=16.

Formulas (1) to (4) described above are the same as formulas described in Non-Patent Literature 2. FIGS. 9A and 9B are explanatory views further illustrating reference pixels in the linear model.

In the example of FIG. 9A, the size of the prediction unit (PU) is 16×16 pixels and the chroma-format is 4:2:0. In this case, the block size of the color difference component is 8×8 pixels. The number of reference pixels $Re_C(i)$ of the color difference component is 8+8=16 (if left and upper reference pixels are both available). The number of reference pixels $Re_L'(i)$ of the luminance component is also 8+8=16 as a result of resampling.

In the example of FIG. 9B, the size of the prediction unit (PU) is 8×8 pixels and the chroma-format is 4:2:0. In this case, the block size of the color difference component is 4×4 pixels. The number of reference pixels $Re_C(i)$ of the color difference component is 4+4=8. The number of reference pixels $Re_L'(i)$ of the luminance component is also 4+4=8 as a result of resampling.

Comparison of two examples of FIGS. 9A and 9B shows that the ratio of the number of reference pixels to the block size remains unchanged if other conditions of the chroma-format and the like are the same. That is, while the size of one side of the prediction unit in the example of FIG. 9A is 16 pixels and the number I of reference pixels is 16, the size of one side of the prediction unit in the example of FIG. 9B is eight pixels and the number I of reference pixels is eight. Thus, if the number I of reference pixels increases with an increasing block size, the processing cost needed to calculate the coefficient α and the coefficient β using Formula (3) and Formula (4) respectively also increases. As will be understood by focusing particularly on Formula (3), the number of times of multiplication of pixel values increases on the order of the square of the number I of reference pixels. Thus, if the number I of reference pixels is not appropriately controlled when calculating the coefficient α and the coefficient β, it is highly probable that performance of encoding and decoding is degraded when the block size is large.

Therefore, as will be described in the next section, the prediction controller 42 variably controls the number of reference pixels when the coefficient calculation section 44 calculates the coefficient α and the coefficient β of a prediction function in LM mode.

[1-5. Control of the Number of Reference Pixels]

The prediction controller 42 typically controls the reference ratio as a ratio of the number of reference pixels to the block size so as to decrease with an increasing block size. An increase in processing cost is thereby curbed when the block size increases. When the block size is small to the extent that the processing cost presents no problem, the prediction controller 42 may not change the reference ratio even if the block sizes are different. Five exemplary scenarios of control of the reference ratio will be described below with reference to FIGS. 10 to 18B.

(1) First Scenario

FIG. 10 is an explanatory view showing an example of the definition of the reference ratio in a first scenario.

In the first scenario, the reference ratio is "1:1" if the size of the prediction unit (PU) is 4×4 pixels. The reference ratio "1:1" means that, as shown in FIGS. 9A and 9B, reference pixels are all used. In this case, if the chroma-format is 4:2:0, the number I of reference pixels is 2(vertical direction $I_v$)+2(horizontal direction $I_h$)=4. If the chroma-format is 4:2:2, the number I of reference pixels is 4+2=6. If the chroma-format is 4:4:4, the number I of reference pixels is 4+4=8.

Similarly, when the size of the prediction unit is 8×8 pixels, the reference ratio is also "1:1". In this case, if the chroma-format is 4:2:0, the number I of reference pixels is 4+4=8. If the chroma-format is 4:2:2, the number I of reference pixels is 8+4=12. If the chroma-format is 4:4:4, the number I of reference pixels is 8+8=16.

When the size of the prediction unit is 16×16 pixels, by contrast, the reference ratio is "2:1". The reference ratio "2:1" means that, as shown in FIGS. 9A and 9B, only half the reference pixels are used. That is, the coefficient calculation section 44 thins out half the reference pixels and uses only remaining reference pixels when calculating the coefficient α and the coefficient β. In this case, if the chroma-format is 4:2:0, the number I of reference pixels is (8/2)+(8/2)=8. If the chroma-format is 4:2:2, the number I of reference pixels is (16/2)+(8/2)=12. If the chroma-format is 4:4:4, the number I of reference pixels is (16/2)+(16/2)=16.

FIG. 11A shows an example of reference pixel settings when the PU size is 16×16 pixels and the chroma-format is 4:2:0. In the example of FIG. 11A, every second reference pixel of the color difference component and every second reference pixel of the luminance component are thinned out. As a result, the number $I_C$ of reference pixels of the color difference component and the number $I_L$ of reference pixels of the luminance component are both eight.

Further, when the size of the prediction unit is 32×32 pixels, the reference ratio is "4:1". The reference ratio "4:1" means that, as shown in FIGS. 9A and 9B, only one fourth of reference pixels is used. That is, the coefficient calculation section 44 thins out three fourths of reference pixels and uses only remaining reference pixels when calculating the coefficient α and the coefficient β. In this case, if the chroma-format is 4:2:0, the number I of reference pixels is (16/4)+(16/4)=8. If the chroma-format is 4:2:2, the number I of reference pixels is (32/4)+(16/4)=12. If the chroma-format is 4:4:4, the number I of reference pixels is (32/4)+(32/4)=16.

FIG. 11B shows an example of reference pixel settings when the PU size is 32×32 pixels and the chroma-format is 4:2:0. In the example of FIG. 11B, three reference pixels in every four consecutive pixels of the color difference component and three reference pixels in every four consecutive pixels of the luminance component are thinned out. As a result, the number $I_C$ of reference pixels of the color difference component and the number $I_L$ of reference pixels of the luminance component are both eight.

According to mapping between the block size and reference ratio like in the first scenario, the number I of reference pixels is constant when the block size is 8×8 pixels or more as long as the chroma-format is the same. Therefore, an increase in processing cost is curbed when the block size increases. In addition, by controlling the reference ratio so that the number of reference pixels is constant when the block size exceeds a predetermined size, coefficient calculation processing by the coefficient calculation section 44 can be performed by using a small common circuit or logic. Accordingly, an increase of the circuit scale or logic scale can also be curbed.

By setting the number of reference pixels to be thinned out to zero when the block size falls short of a predetermined size, the degradation of prediction accuracy in LM mode due to an insufficient number of reference pixels can be prevented. Particularly when it is comparatively difficult to make an intra prediction due to complex content of an image (that is, spatial fluctuations of the pixel value are violent), a smaller prediction unit is likely to be set to inside an image. By securing a sufficient number of reference pixels in such a case, the degradation of prediction accuracy in LM mode can be prevented.

Here, a description is provided that the number of reference pixels to be thinned out when a coefficient is calculated by the coefficient calculation section 44 changes in accordance with the reference ratio. That is, the coefficient calculation section 44 has also a role of a thinning section that thins out reference pixels referenced when an intra prediction in LM mode is made in the reference ratio in accordance with the block size to be predicted. This also applies to a coefficient calculation section 94 of an image decoding device 60 described later. However, instead of thinning out reference pixels, the number of reference pixels may variably be controlled by deriving one representative value from a plurality of reference pixel values. If, for example, the reference ratio is "4:1", an average value of pixels values of four consecutive reference pixels or a median value thereof may be used as a representative value. This also applies to other scenarios described herein. While it is quite easy to implement processing to thin out reference pixels, the prediction accuracy can be improved by using the above representative value.

(2) Second Scenario

FIG. 12 is an explanatory view showing an example of the definition of the reference ratio in a second scenario. In the second scenario, the prediction controller 42 controls the reference ratio in accordance with the chroma-format, in addition to the size of the prediction unit. In addition, the prediction controller 42 separately controls a first reference ratio as a ratio of the number of left reference pixels to the size in the vertical direction and a second reference ratio as a ratio of the number of upper reference pixels to the size in the horizontal direction.

In the second scenario, if the size of the prediction unit is 4×4 pixels and the chroma-format is 4:2:0, the reference ratio in the vertical direction and the reference ratio in the horizontal direction are both "1:1". In this case, no reference pixel is thinned out and the number I of reference pixels is 2+2=4. If the size of the prediction unit is 4×4 pixels and the chroma-format is 4:2:2, the reference ratio in the vertical direction is "2:1" and the reference ratio in the horizontal direction is "1:1". In this case, as a result of half the reference pixels of the reference pixels in the vertical direction being thinned out, the number I of reference pixels is (4/2)+2=4. If the size of the prediction unit is 4×4 pixels and the chroma-format is 4:4:4, the reference ratio in the vertical direction and the reference ratio in the horizontal direction are both "2:1". In this case, as a result of half the reference pixels of the reference pixels in both the vertical direction and the horizontal direction being thinned out, the number I of reference pixels is (4/2)+(4/2)=4.

If the size of the prediction unit is 8×8 pixels and the chroma-format is 4:2:0, the reference ratio in the vertical direction and the reference ratio in the horizontal direction are both "1:1". In this case, no reference pixel is thinned out and the number I of reference pixels is 4+4=8. If the size of the prediction unit is 8×8 pixels and the chroma-format is 4:2:2, the reference ratio in the vertical direction is "2:1" and the reference ratio in the horizontal direction is "1:1". In this case, as a result of half the reference pixels of the reference pixels in the vertical direction being thinned out, the number I of reference pixels is (8/2)+4=8. If the size of the prediction unit is 8×8 pixels and the chroma-format is 4:4:4, the reference ratio in the vertical direction and the reference ratio in the horizontal direction are both "2:1". In this case, as a result of half the reference pixels of the reference pixels in both the vertical direction and the horizontal direction being thinned out, the number I of reference pixels is (8/2)+(8/2)=8.

FIG. 13A shows an example of reference pixel settings when the PU size is 8×8 pixels and the chroma-format is 4:2:0. In the example of FIG. 13A, neither reference pixels of the color difference component nor reference pixels of the luminance component are thinned out. As a result, the number $I_C$ of reference pixels of the color difference component and the number $I_L$ of reference pixels of the luminance component are both eight.

FIG. 13B shows an example of reference pixel settings when the PU size is 8×8 pixels and the chroma-format is 4:2:2. In the example of FIG. 13B, every second reference pixel in the vertical direction of the color difference component and the luminance component is thinned out. As a result, the number $I_C$ of reference pixels of the color difference component and the number $I_L$ of reference pixels of the luminance component are both eight.

Further, FIG. 13C shows an example of reference pixel settings when the PU size is 8×8 pixels and the chroma-format is 4:4:4. In the example of FIG. 13C, every second reference pixel in the vertical direction and the horizontal direction of the color difference component and the luminance component is thinned out. As a result, the number $I_C$ of reference pixels of the color difference component and the number $I_L$ of reference pixels of the luminance component are both eight.

If the size of the prediction unit is 16×16 pixels and the chroma-format is 4:2:0, the reference ratio in the vertical direction and the reference ratio in the horizontal direction are both "2:1". In this case, the number I of reference pixels is (8/2)+(8/2)=8. If the size of the prediction unit is 16×16 pixels and the chroma-format is 4:2:2, the reference ratio in the vertical direction is "4:1" and the reference ratio in the horizontal direction is "2:1". In this case, the number I of reference pixels is (16/4)+(8/2)=8. If the size of the prediction unit is 16×16 pixels and the chroma-format is 4:4:4, the reference ratio in the vertical direction and the reference ratio in the horizontal direction are both "4:1". In this case, the number I of reference pixels is (16/4)+(16/4)=8.

Figure 13D:
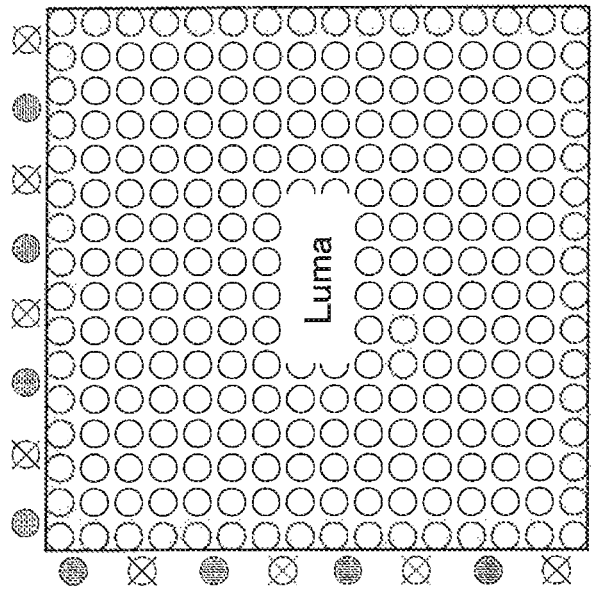
FIG. 13D is an explanatory view showing a fourth example of the number of reference pixels controlled according to the second scenario.

FIG. 13D shows an example of reference pixel settings when the PU size is 16×16 pixels and the chroma-format is 4:2:0. In the example of FIG. 13D, every second reference pixel in the vertical direction and the horizontal direction of the color difference component and the luminance component is thinned out. As a result, the number $I_C$ of reference pixels of the color difference component and the number $I_L$ of reference pixels of the luminance component are both eight.

If the size of the prediction unit is 32×32 pixels and the chroma-format is 4:2:0, the reference ratio in the vertical direction and the reference ratio in the horizontal direction are both "4:1". In this case, the number I of reference pixels is (16/4)+(16/4)=8. If the size of the prediction unit is 32×32 pixels and the chroma-format is 4:2:2, the reference ratio in the vertical direction is "8:1" and the reference ratio in the horizontal direction is "4:1". In this case, the number I of reference pixels is (32/8)+(16/4)=8. If the size of the prediction unit is 32×32 pixels and the chroma-format is 4:4:4, the reference ratio in the vertical direction and the reference ratio in the horizontal direction are both "8:1". In this case, the number I of reference pixels is (32/8)+(32/8)=8.

In the second scenario, as will be understood from the above description, the prediction controller 42 controls the reference ratio so that the reference ratio decreases with an increasing resolution of the color difference component represented by the chroma-format. An increase in processing cost accompanying an increasing block size of the color difference component is thereby curbed. Also in the second scenario, if the chroma-format is 4:2:2, the prediction controller 42 separately controls the reference ratio in the vertical direction and the reference ratio in the horizontal direction so that the number of reference pixels on the left of the block and the number of reference pixels above the block become equal. Accordingly, the numbers of reference pixels can be made the same in a plurality of cases in which chroma-formats are mutually different. As a result, coefficient calculation processing by the coefficient calculation section 44 can be performed by using a common circuit or logic regardless of the chroma-format. Therefore, according to the second scenario, efficient implementation of a circuit or logic is promoted.

(3) Third Scenario

FIG. 14 is an explanatory view showing an example of the definition of the reference ratio in a third scenario. Also in the third scenario, the prediction controller 42 separately controls the first reference ratio as a ratio of the number of left reference pixels to the size in the vertical direction and the second reference ratio as a ratio of the number of upper reference pixels to the size in the horizontal direction. In the third scenario, the prediction controller 42 controls the reference ratios so that the reference ratio in the vertical direction is equal to the reference ratio in the horizontal direction or less to the same size.

In the third scenario, the reference ratios in the vertical direction and the horizontal direction are both "1:1" if the size of the prediction unit is 4×4 pixels. In this case, if the chroma-format is 4:2:0, the number I of reference pixels is 2+2=4. If the chroma-format is 4:2:2, the number I of reference pixels is 4+2=6. If the chroma-format is 4:4:4, the number I of reference pixels is 4+4=8.

If the size of the prediction unit is 8×8 pixels, the reference ratio in the vertical direction is "2:1" and the reference ratio in the horizontal direction is "1:1". In this case, if the chroma-format is 4:2:0, the number I of reference pixels is (4/2)+4=6. If the chroma-format is 4:2:2, the number I of reference pixels is (8/2)+4=8. If the chroma-format is 4:4:4, the number I of reference pixels is (8/2)+8=12.

FIG. 15A shows an example of reference pixel settings when the PU size is 8×8 pixels and the chroma-format is 4:2:0. In the example of FIG. 15A, lower half the reference pixels in the vertical direction of reference pixels of the color difference component and reference pixels of the luminance component are thinned out. As a result, the number $I_C$ of reference pixels of the color difference component and the number $I_L$ of reference pixels of the luminance component are both six.

If the size of the prediction unit is 16×16 pixels, the reference ratio in the vertical direction is "4:1" and the reference ratio in the horizontal direction is "1:1". In this case, if the chroma-format is 4:2:0, the number I of reference pixels is (8/4)+8=10. If the chroma-format is 4:2:2, the number I of reference pixels is (16/4)+8=12. If the chroma-format is 4:4:4, the number I of reference pixels is (16/4)+16=20.

FIG. 15B shows an example of reference pixel settings when the PU size is 16×16 pixels and the chroma-format is 4:2:0. In the example of FIG. 15B, three fourths of the lower half reference pixels in the vertical direction of reference pixels of the color difference component and reference pixels of the luminance component are thinned out. As a result, the number $I_C$ of reference pixels of the color difference component and the number $I_L$ of reference pixels of the luminance component are both 10.

If the size of the prediction unit is 32×32 pixels, the reference ratio in the vertical direction is "8:1" and the reference ratio in the horizontal direction is "2:1". In this case, if the chroma-format is 4:2:0, the number I of reference pixels is (16/8)+(16/2)=10. If the chroma-format is 4:2:2, the number I of reference pixels is (32/8)+(16/2)=12. If the chroma-format is 4:4:4, the number I of reference pixels is (32/8)+(32/2)=20.

In a device that encodes or decodes images, the reference pixel value is stored in a frame memory or line memory in most cases and accessed in units of line in the horizontal direction. Therefore, if the reference ratio in the vertical direction is made smaller than the reference ratio in the horizontal direction like in the third scenario, the number of times of accessing a memory can be reduced even if the number of reference pixels to be used is the same. Accordingly, coefficient calculation processing by the coefficient calculation section 44 can be performed at high speed. In addition, by using reference pixels in an upper line of the block preferentially like in the third scenario, the reference pixel value can be acquired in a short time through continuous access to the memory.

(4) Fourth Scenario

FIG. 16 is an explanatory view showing an example of the definition of the reference ratio in a fourth scenario. In the fourth scenario, the prediction controller 42 controls the reference ratio so that the reference ratio decreases with decreasing capabilities of a device that encodes and decodes images. In HEVC, for example, the profile, the level, or both can be used as parameters representing capabilities of a device. The profile and the level can normally be specified in a sequence parameter set of an encoded stream.

Referring to FIG. 16, in the fourth scenario, capabilities of a device are classified into two categories of "high" and "low". Regarding the prediction unit having the size of 4×4 pixels, the reference ratio is "1:1" regardless of capabilities of a device. Regarding the prediction unit having the size of 8×8 pixels or more, by contrast, the reference ratio when capabilities are "low" is half the reference ratio when capabilities are "high".

For example, while the reference ratio when capabilities are "high" is "1:1" for the prediction unit of 8×8 pixels, the reference ratio when capabilities are "low" is "2:1". Regarding the prediction unit having the size of 16×16 pixels, while the reference ratio when capabilities are "high" is "2:1", the reference ratio when capabilities are "low" is "4:1". Regarding the prediction unit having the size of 32×32 pixels, while the reference ratio when capabilities are "high" is "4:1", the reference ratio when capabilities are "low" is "8:1".

FIG. 17A shows an example of reference pixel settings when the PU size is 16×16 pixels, the chroma-format is 4:2:0, capabilities are "high", and the reference ratio is "2:1". In the example of FIG. 17A, half the reference pixels of reference pixels of the color difference component and reference pixels of the luminance component are thinned out. As a result, the number $I_C$ of reference pixels of the color difference component and the number $I_L$ of reference pixels of the luminance component are both eight.

FIG. 17B shows an example of reference pixel settings when the PU size is 16×16 pixels, the chroma-format is 4:2:0, capabilities are "low", and the reference ratio is "4:1". In the example of FIG. 17B, three fourths of the lower half reference pixels of reference pixels of the color difference component and reference pixels of the luminance component are thinned out. As a result, the number $I_C$ of reference pixels of the color difference component and the number $I_L$ of reference pixels of the luminance component are both four.

By controlling the reference ratio in accordance with the level of capabilities of a device (for example, the processing capacity of a decoder) like in the fourth scenario, the number of reference pixels can further be reduced when the use of a device of lower capabilities is assumed. Accordingly, the processing cost exceeding the processing capacity of a device can be prevented from arising in coefficient calculation processing in LM mode.

(5) Fifth Scenario

Xiaoran Cao Tsinghua et al. propose in "CE6.b1 Report on Short Distance Intra Prediction Method" (JCTVC-E278, March 2011) the short distance intra prediction method that improves encoding efficiency by using a small-sized non-square prediction unit. In the short distance intra prediction method, for example, prediction units of various sizes such as 1×4 pixels, 2×8 pixels, 4×16 pixels, 4×1 pixels, 8×2 pixels, and 16×4 pixels can be set into an image. In this case, which of the size in the vertical direction and the size in the horizontal direction of the prediction unit is larger depends on settings of the prediction unit. Thus, in the fifth scenario, when the short distance intra prediction method is used, the prediction controller 42 dynamically selects the reference ratio corresponding to the direction to which larger of the reference ratio in the vertical direction and the reference ratio in the horizontal ratio corresponds and controls the selected reference ratio.

FIG. 18A shows an example of reference pixel settings when the PU size is 2×8 pixels and the chroma-format is 4:2:0. In the example of FIG. 18A, the size in the horizontal direction is larger than the size in the vertical direction and thus, while the reference ratio in the vertical direction is "1:1", the reference ratio in the horizontal direction is "2:1". As a result, the number $I_C$ of reference pixels of the color difference component and the number $I_L$ of reference pixels of the luminance component are both 1+(4/2)=3.

FIG. 18B shows an example of reference pixel settings when the PU size is 16×4 pixels and the chroma-format is 4:2:0. In the example of FIG. 18B, the size in the vertical direction is larger than the size in the horizontal direction and thus, while the reference ratio in the horizontal direction is "1:1", the reference ratio in the vertical direction is "4:1". As a result, the number $I_C$ of reference pixels of the color difference component and the number $I_L$ of reference pixels of the luminance component are both (8/4)+2=4.

When, like in the fifth scenario, the short distance intra prediction method is used, by dynamically selecting and controlling the reference ratio corresponding to the direction in which the size is larger, the degradation in prediction accuracy can be prevented by avoiding the reduction of the number of reference pixels in the direction in which the number thereof is smaller.

Heretofore, five characteristic scenarios of control of the reference ration by the prediction controller 42 have been described in detail. The control of the reference ratio by the prediction controller 42 according to these scenarios may be performed by mapping, for example, between the block size pre-defined in standard specifications of an image encoding scheme and the reference ratio. By uniformly defining such mapping in advance, the need to support setting patterns of many reference pixels is eliminated so that a circuit or logic for decoding can easily be made common.

While the bit depth of image data utilized for many uses is 8 bits, a greater bit depth such as 10 bits or 12 bits may be used for image data for some uses. Thus, if the bit depth exceeds a predetermined number of bits (for example, 8 bits), the coefficient calculation section 44 may reduce the reference pixel value to the predetermined number of bits before calculating the coefficient α and the coefficient β of a prediction function using the reduced reference pixel value. Accordingly, the coefficient α and the coefficient β can be calculated using a small-sized common circuit or logic regardless of the bit depth.

An example in which the prediction controller 42 controls the "reference ratio" as a ratio of the number of reference pixels to the block size is mainly described here. However, the concept substantially equivalent to the reference ratio may be expressed by another term, for example, a "reduction ratio" meaning the ratio of reference pixels to be reduced. The "reference ratio" or "reduction ratio" may be expressed by, instead of the above format such as "1:1", "2:1", and "4:1", the percentage format like "100% (0%)", "50% (50%)", or "25% (75%)" or the numeric format in the range from 0 to 1.

The above five scenarios are only examples for description. For example, two scenarios or more of the above five scenarios may be combined. Mapping between the block size and the reference ratio (or the reduction ratio) as shown in each scenario may be, instead of defined in advance, adaptively selected. In this case, information specifying the selected mapping may be transmitted from the encoding side to the decoding side inside the parameter set or the header area of an encoded stream.

<2. Flow of Processing at the Time of Encoding According to an Embodiment>

Figure 19:
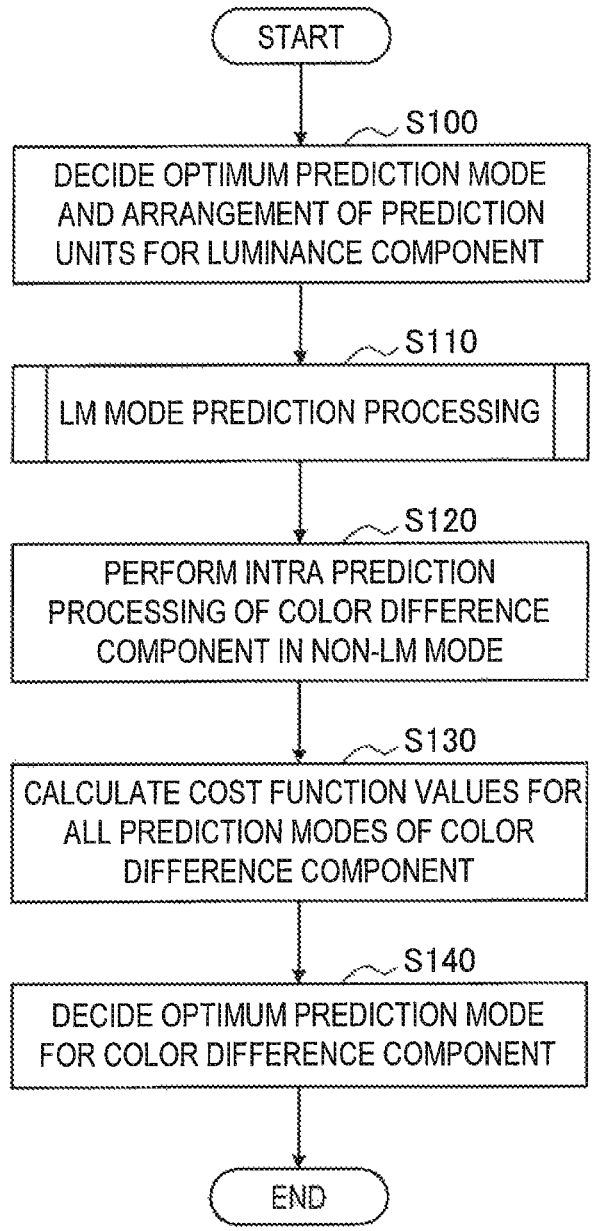
FIG. 19 is a flow chart showing an example of the intra prediction process at the time of encoding according to the embodiment.

Next, the flow of processing at the time of encoding will be described using FIGS. 19 and 20. FIG. 19 is a flow chart showing an example of the flow of intra prediction processing at the time of encoding by the intra prediction section 40 having the configuration as illustrated in FIG. 2.

Referring to FIG. 19, predicted image data in various prediction modes is first generated by the prediction section 46 for the luminance component of the coding unit to be processed and the optimum prediction mode and the arrangement of prediction units are decided by the mode determination section 48 (step S100).

Next, prediction processing in LM mode is performed for the color difference component by the coefficient calculation section 44 and the prediction section 46 (step S110). In addition, intra prediction processing in non-LM mode (for example, Mode 0 to Mode 3 illustrated in FIG. 8) is performed for the color difference component by the coefficient calculation section 44 and the prediction section 46 (step S120). The processing in step S110 and step S120 can be performed for each prediction unit under the control of the prediction controller 42.

Next, the mode determination section 48 calculates the cost function value based on original image data and predicted image data for each of the prediction modes of the color difference component (step S130). Then, the mode determination section 48 decides the optimum prediction mode by comparing the cost function values (step S140).

Figure 20:
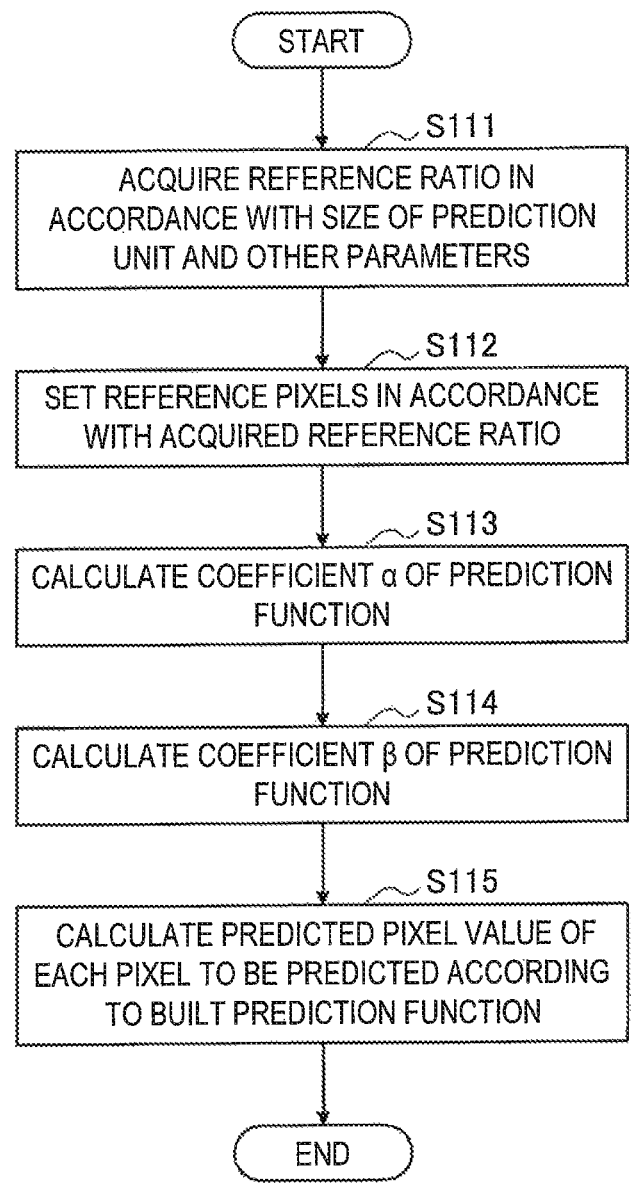
FIG. 20 is a flow chart showing an example of a detailed flow of LM mode prediction processing in FIG. 19.

FIG. 20 is a flow chart showing an example of a detailed flow of LM mode prediction processing in step S110 of FIG. 19.

Referring to FIG. 20, the prediction controller 42 first acquires the reference ratio for each prediction unit in accordance with the size of the prediction unit and other parameters (for example, the chroma-format, profile, or level) (step S111).

Next, the coefficient calculation section 44 sets reference pixels to be referenced by the calculation formula (for example, the above Formula (3) and Formula (4)) to calculate coefficients of a prediction function according to the reference ratio instructed by the prediction controller 42 (step S112). The number of reference pixels set here can be reduced in accordance with the reference ratio. In addition, the luminance components of reference pixels can be resampled depending on the chroma-format.

Next, the coefficient calculation section 44 calculates the coefficient α of a prediction function using pixel values of set reference pixels according to, for example, the above Formula (3) (step S113). Further, the coefficient calculation section 44 calculates the coefficient β of a prediction function using pixel values of set reference pixels according to, for example, the above Formula (4) (step S114).

Then, the prediction section 46 calculates the predicted pixel value of each pixel to be predicted by substituting the value of the corresponding luminance component into a prediction function (for example, the above Formula (1)) built by using the coefficient α and the coefficient β (step S115).

<3. Example Configuration of Image Decoding Device According to an Embodiment>

In this section, an example configuration of an image decoding device according to an embodiment will be described using FIGS. 21 and 22.

[3-1. Example of Overall Configuration]

Figure 21:
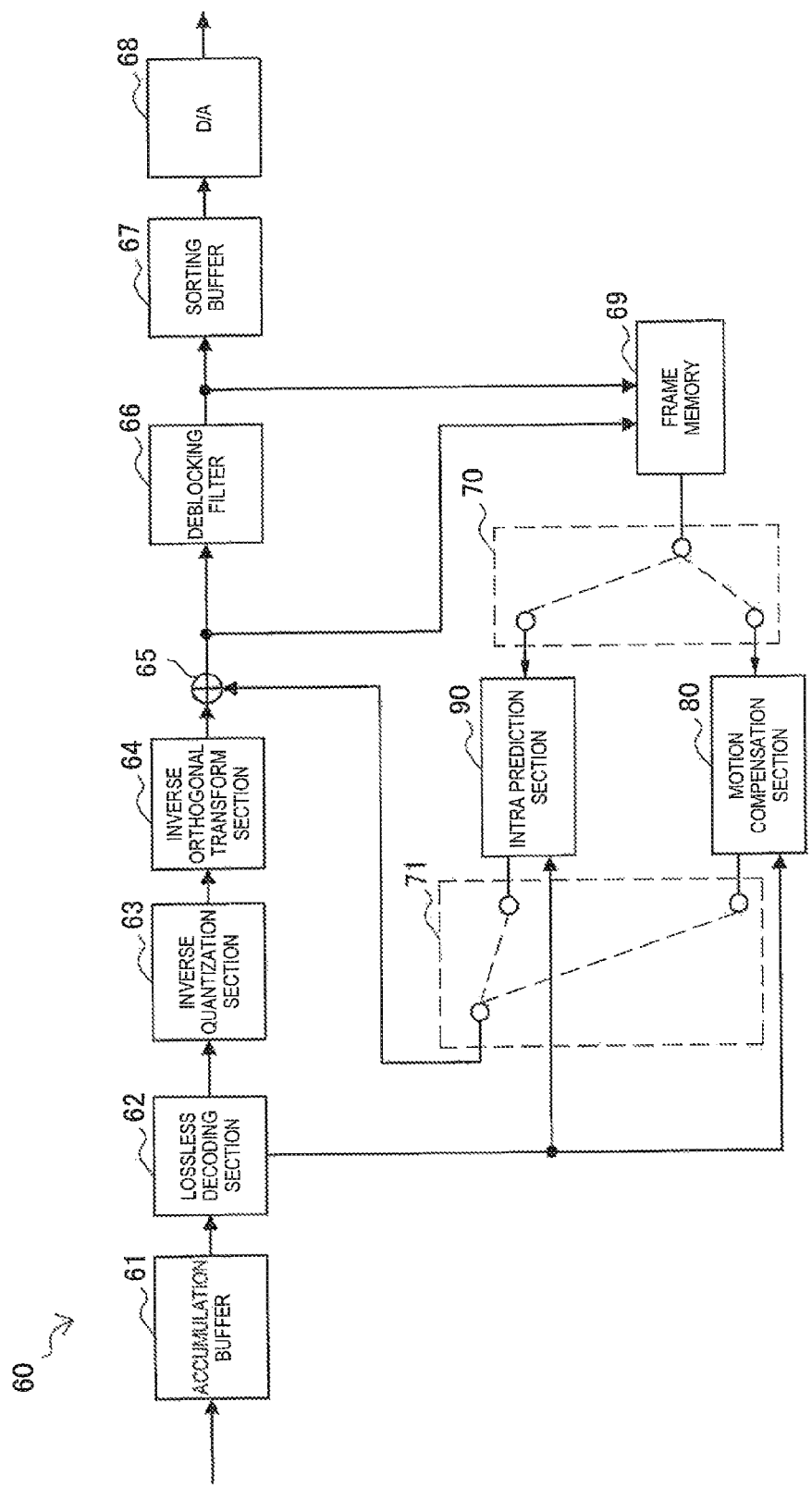
FIG. 21 is a block diagram showing an example of a detailed configuration of the image decoding device according to the embodiment.

FIG. 21 is a block diagram showing an example of a configuration of an image decoding device 60 according to an embodiment. Referring to FIG. 21, the image decoding device 60 includes an accumulation buffer 61, a lossless decoding section 62, an inverse quantization section 63, an inverse orthogonal transform section 64, an addition section 65, a deblocking filter 66, a sorting buffer 67, a D/A (Digital to Analogue) conversion section 68, a frame memory 69, selectors 70 and 71, a motion compensation section 80 and an intra prediction section 90.

The accumulation buffer 61 temporarily stores an encoded stream input via a transmission line using a storage medium.

The lossless decoding section 62 decodes an encoded stream input from the accumulation buffer 61 according to the encoding method used at the time of encoding. Also, the lossless decoding section 62 decodes information multiplexed to the header region of the encoded stream. Information that is multiplexed to the header region of the encoded stream may include the profile and the level in a sequence parameter set, and the information about inter prediction and information about intra prediction in the block header, for example. The lossless decoding section 62 outputs the information about inter prediction to the motion compensation section 80. Also, the lossless decoding section 62 outputs the information about intra prediction to the intra prediction section 90.

The inverse quantization section 63 inversely quantizes quantized data which has been decoded by the lossless decoding section 62. The inverse orthogonal transform section 64 generates predicted error data by performing inverse orthogonal transformation on transform coefficient data input from the inverse quantization section 63 according to the orthogonal transformation method used at the time of encoding. Then, the inverse orthogonal transform section 64 outputs the generated predicted error data to the addition section 65.

The addition section 65 adds the predicted error data input from the inverse orthogonal transform section 64 and predicted image data input from the selector 71 to thereby generate decoded image data. Then, the addition section 65 outputs the generated decoded image data to the deblocking filter 66 and the frame memory 69.

The deblocking filter 66 removes block distortion by filtering the decoded image data input from the addition section 65, and outputs the decoded image data after filtering to the sorting buffer 67 and the frame memory 69.

The sorting buffer 67 generates a series of image data in a time sequence by sorting images input from the deblocking filter 66. Then, the sorting buffer 67 outputs the generated image data to the D/A conversion section 68.

The D/A conversion section 68 converts the image data in a digital format input from the sorting buffer 67 into an image signal in an analogue format. Then, the D/A conversion section 68 causes an image to be displayed by outputting the analogue image signal to a display (not shown) connected to the image decoding device 60, for example.

The frame memory 69 stores, using a storage medium, the decoded image data before filtering input from the addition section 65, and the decoded image data after filtering input from the deblocking filter 66.

The selector 70 switches the output destination of the image data from the frame memory 70 between the motion compensation section 80 and the intra prediction section 90 for each block in the image according to mode information acquired by the lossless decoding section 62. For example, in the case the inter prediction mode is specified, the selector 70 outputs the decoded image data after filtering that is supplied from the frame memory 70 to the motion compensation section 80 as the reference image data. Also, in the case the intra prediction mode is specified, the selector 70 outputs the decoded image data before filtering that is supplied from the frame memory 70 to the intra prediction section 90 as reference image data.

The selector 71 switches the output source of predicted image data to be supplied to the addition section 65 between the motion compensation section 80 and the intra prediction section 90 according to the mode information acquired by the lossless decoding section 62. For example, in the case the inter prediction mode is specified, the selector 71 supplies to the addition section 65 the predicted image data output from the motion compensation section 80. Also, in the case the intra prediction mode is specified, the selector 71 supplies to the addition section 65 the predicted image data output from the intra prediction section 90.

The motion compensation section 80 performs a motion compensation process based on the information about inter prediction input from the lossless decoding section 62 and the reference image data from the frame memory 69, and generates predicted image data. Then, the motion compensation section 80 outputs the generated predicted image data to the selector 71.

The intra prediction section 90 performs an intra prediction process based on the information about intra prediction input from the lossless decoding section 62 and the reference image data from the frame memory 69, and generates predicted image data. Then, the intra prediction section 90 outputs the generated predicted image data to the selector 71. The intra prediction process of the intra prediction section 90 will be described later in detail.

[3-2. Configuration Example of Intra Prediction Section]

Figure 22:
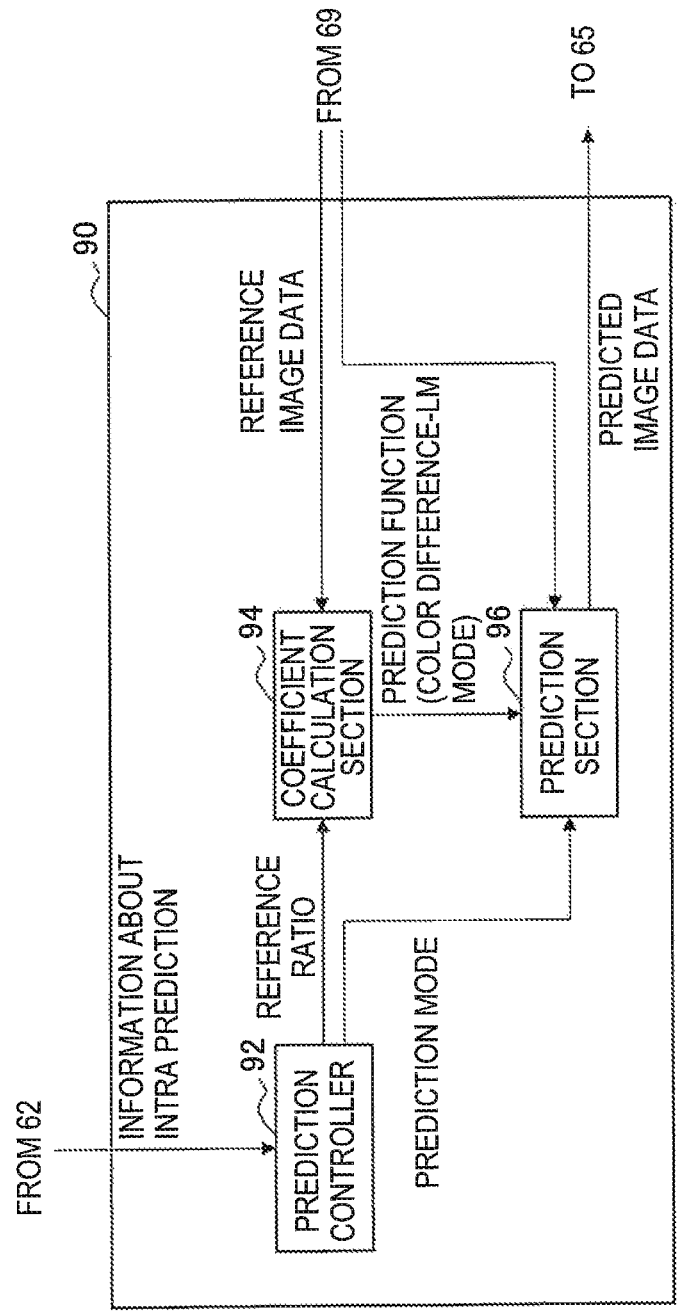
FIG. 22 is a block diagram showing an example of the detailed configuration of the intra prediction section of the image decoding device according to the embodiment.

FIG. 22 is a block diagram showing an example of a detailed configuration of an intra prediction section 90 of the image decoding device 60 shown in FIG. 21. Referring to FIG. 22, the intra prediction section 90 includes a prediction controller 92, a coefficient calculation section 94, and a prediction section 96.

The prediction controller 92 controls intra prediction processing by the intra prediction section 90. For example, the prediction controller 92 sets one prediction unit or more to each coding unit based on prediction mode information contained in information on an intra prediction. The prediction controller 92 performs intra prediction processing of the luminance component (Y) and then performs intra prediction processing of color difference components (Cb, Cr). In the intra prediction processing of the luminance component, the prediction controller 92 causes the prediction section 96 to generate a predicted pixel value of the luminance component of each pixel in prediction mode specified by prediction mode information. Similarly, in the intra prediction processing of the luminance component, the prediction controller 92 causes the prediction section 96 to generate a predicted pixel value of the color difference component of each pixel in prediction mode specified by prediction mode information.

In the present embodiment, prediction mode candidates for the color difference component contain the above-mentioned LM mode. Then, the prediction controller 92 variably controls the ratio of the number of reference pixels when coefficients of a prediction function in LM mode is calculated to the block size, that is, the reference ratio. The control of the reference ratio by the prediction controller 92 is typically performed in accordance with the block size. If, for example, the block size exceeds a predetermined size, the prediction controller 92 may control the reference ratio so that the number of reference pixels for calculating coefficients of a prediction function becomes constant. Mapping between the block size and reference ratio may be defined in advance and stored in a storage medium of the image decoding device 60 or may dynamically be specified inside the header area of an encoded stream. Further, the prediction controller 92 may control the reference ratio in accordance with the chroma-format. Also, the prediction controller 92 may control the reference ratio in accordance with the profile or level defining capabilities of a device. The control of the reference ratio by the prediction controller 92 may be performed according to one of the above five scenarios, any combination thereof, or other scenarios.

The coefficient calculation section 94 calculates coefficients of a prediction function used by the prediction section 96 when the LM mode is specified for the color difference component by referring to pixels around the prediction unit to which the pixel to be predicted belongs, that is, reference pixels. The prediction function used by the prediction section 96 is typically a linear function of the value of the luminance component and is represented by, for example, the above Formula (1). The number of reference pixels referenced by the coefficient calculation section 94 to calculate coefficients of a prediction function is controlled by, as described above, the prediction controller 92. If the reference ratio is not "1:1", the coefficient calculation section 94 may calculate coefficients of a prediction function by, for example, thinning out as many reference pixels as a number in accordance with the reference ratio and then using only remaining reference pixels. The coefficient calculation section 94 may calculate coefficients of a prediction function using a common circuit or logic for a plurality of block sizes exceeding a predetermined size. In addition, if the bit depth of a pixel value exceeds a predetermined number of bits, the coefficient calculation section 94 may reduce the reference pixel value to the predetermined number of bits before calculating coefficients of a prediction function using the reduced reference pixel value.

The prediction section 96 generates the pixel value of the luminance component and the pixel value of the color difference component of the pixel to be predicted according to the specified prediction mode using reference image data from a frame memory 69 under the control of the prediction controller 92. Prediction mode candidates used for the color difference component by the prediction section 96 may contain the above LM mode. When the LM mode is specified, the prediction section 96 calculates the predicted pixel value of the color difference component by substituting the value (resampled if necessary) of the corresponding luminance component into a prediction function built by using the coefficient α and the coefficient β calculated by the coefficient calculation section 94. The prediction section 96 outputs predicted image data generated as a result of prediction to an addition section 65 via a selector 71.

<4. Flow of Processing at the Time of Decoding According to an Embodiment>

Figure 23:
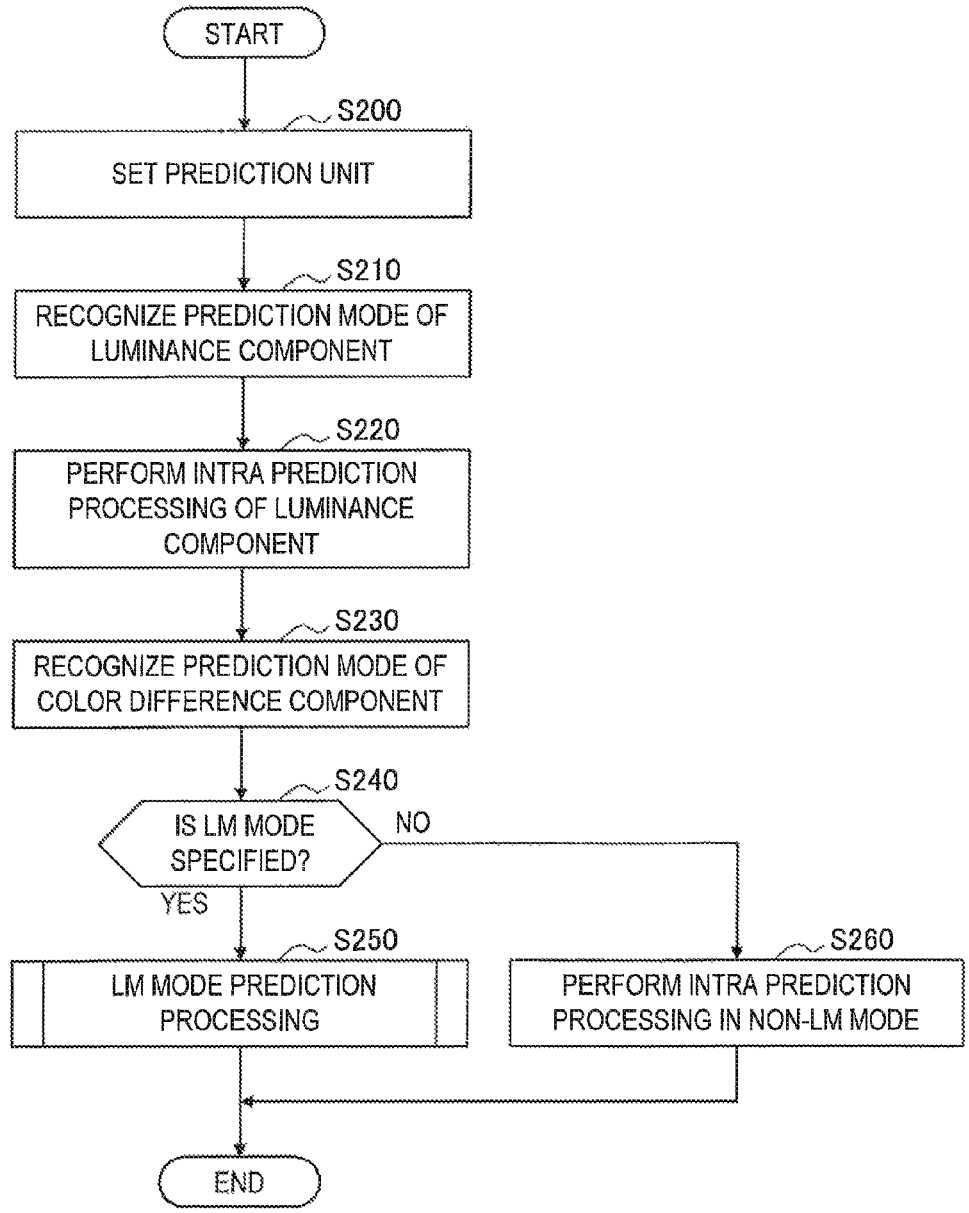
FIG. 23 is a flow chart showing an example of a flow of an intra prediction process at the time of decoding according to an embodiment.

Next, the flow of processing at the time of decoding will be described using FIG. 23. FIG. 23 is a flow chart showing an example of the flow of intra prediction processing at the time of decoding by the intra prediction section 90 having the configuration as illustrated in FIG. 22.

Referring to FIG. 23, the prediction controller 92 first sets one prediction unit or more to each coding unit (step S200). Then, processing in steps S210 to S260 can be performed on each prediction unit under the control of the prediction controller 42.

Next, the prediction controller 92 recognizes the prediction mode of the luminance component specified by the prediction mode information (step S210). Then, the prediction section 96 generates the predicted pixel value of the luminance component of each pixel in the prediction unit according to the specified prediction mode using reference image data from the frame memory 69 (step S220).

Next, the prediction controller 92 recognizes the prediction mode of the color difference component specified by the prediction mode information (step S230). Then, the prediction controller 92 determines whether the LM mode is specified (step S240). If the LM mode is specified, the prediction controller 92 causes the coefficient calculation section 94 and the prediction section 96 to perform prediction processing of the color difference component in LM mode (step S250). The LM mode prediction processing in step S250 may be similar to the LM mode prediction processing described using FIG. 20. On the other hand, if the LM mode is not specified, the prediction controller 92 causes the prediction section 96 to perform intra prediction processing of the color difference component in non-LM mode (step S260).

<5. Modifications>

In the above embodiment, the prediction section 46 of the intra prediction section 40 of the image encoding device 10 calculates the predicted pixel value of the color difference component in LM mode according to the above Formula (1). Similarly, the prediction section 96 of the intra prediction section 90 of the image decoding device 60 calculates the predicted pixel value of the color difference component in LM mode according to the above Formula (1). $Re_L'(x, y)$ on the right-hand side of Formula (1) represents the value of the pixel position (x, y) of the luminance component of a decoded image after resampling. Thus, when the calculation of the predicted pixel value is done in blocks, the pixel value of the luminance component after resampling in blocks is held until the predicted pixel value of the color difference component is calculated.

Figure 24:
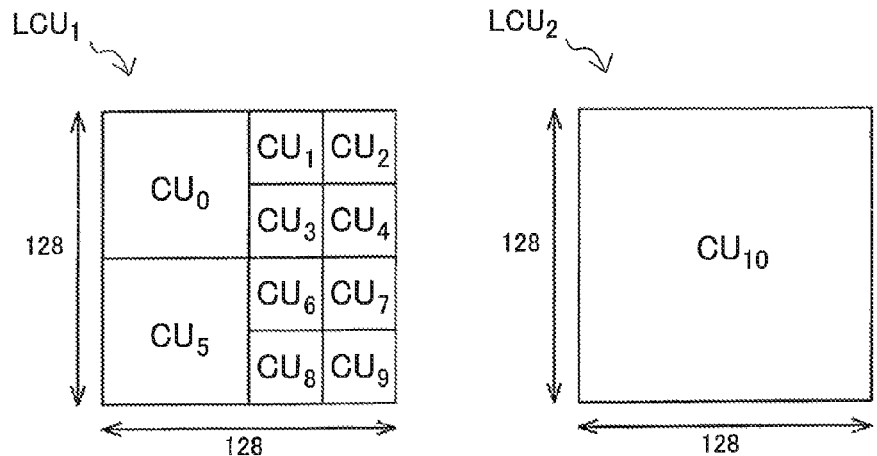
FIG. 24 is an explanatory view illustrating the size of a memory that holds a pixel value after the luminance component being resampled.

For example, $LCU_1$ shown on the left of FIG. 24 is divided into 10 coding units $CU_0$ to $CU_9$. As an example, the size of $LCU_1$ is 128×128 pixels, the size of the coding units $CU_0$ and $CU_5$ is 64×64 pixels, and the size of the coding units $CU_1$ to $CU_4$ and $CU_6$ to $CU_9$ is 32×32 pixels. The calculation of the predicted pixel value is normally done for each coding unit and thus, if the chroma-format is 4:2:0 in this case, a memory of 32×32 pixels (particularly for the coding units $CU_0$ and $CU_5$) may be provided to hold pixel values of the luminance components after resampling. On the other hand, the size of $LCU_2$ shown on the right of FIG. 24 is 128×128 pixels and only one $CU_{10}$ is contained inside $LCU_2$. If the chroma-format is 4:2:0 in this case, a memory of 64×64 pixels may be provided to hold pixel values of the luminance components after resampling. The amount of consumption of memory resources increases with an increasing bit depth of a pixel.

The above increase of the amount of consumption of memory resources is not desirable for a device whose memory resources are limited. Thus, in this section, two modifications to reduce the amount of consumption of memory resources in connection with the introduction of the LM mode will be described.

[5-1. First Modification]

In a first modification, the prediction section 46 of the image encoding device 10 and the prediction section 96 of the image decoding device 60 thin out luminance components corresponding to each color difference component at some thinning rate. The luminance component corresponding to each color difference component corresponds to each luminance component after resampling according to, for example, the above Formula (2). Then, the prediction section 46 and the prediction section 96 generate the predicted values of each color difference component corresponding to thinned luminance components by using values of luminance components that are not thinned out.

Figure 25:
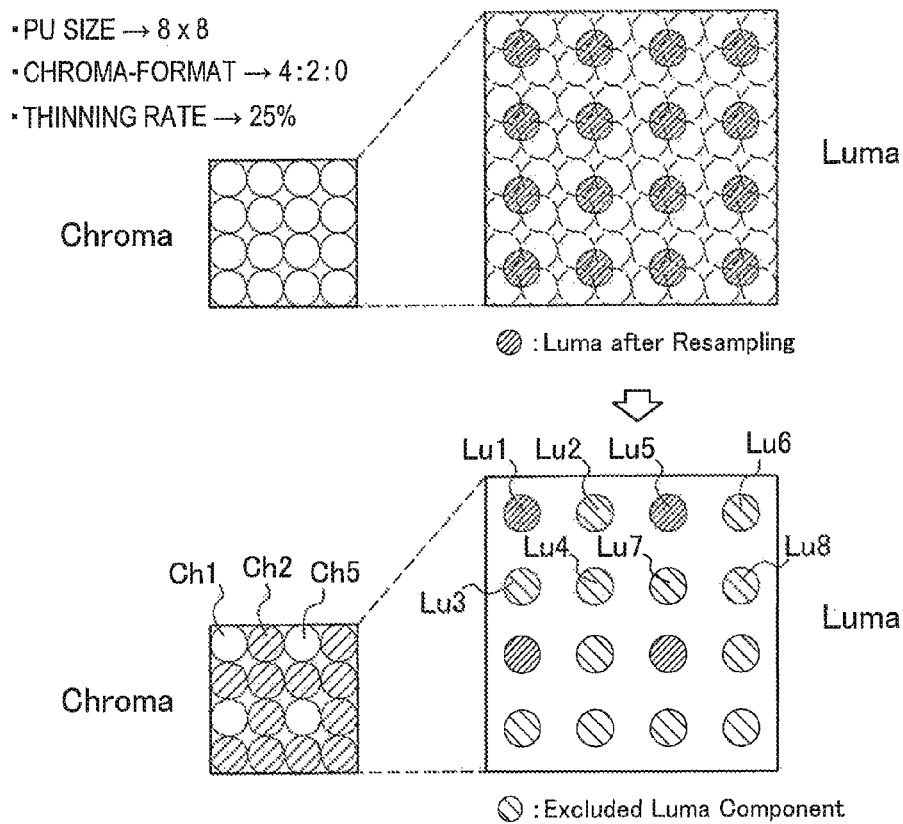
FIG. 25 is an explanatory view illustrating an example of thinning processing according to a first modification.

FIG. 25 is an explanatory view illustrating an example of thinning processing according to the present modification. Referring to FIG. 25, the prediction unit (PU) of 8×8 pixels is shown as an example. It is assumed that the chroma-format 4:2:0 and the thinning rate is 25%. The thinning rate indicates the ratio of the number of pixels after thinning to the number of pixels before thinning. In the example of FIG. 25, the number of color difference components contained in one PU is 4×4. The number of luminance components corresponding to each color difference component is also 4×4 due to resampling. As a result of thinning luminance components after resampling at the thinning rate 25%, the number of luminance components used to predict the color difference component in LM mode is 2×2. More specifically, in the example at the lower right of FIG. 25, among four luminance components Lu1 to Lu4, the luminance components Lu2, Lu3, Lu4 other than the luminance component Lu1 are thinned out. Similarly, among four luminance components Lu5 to Lu8, the luminance components Lu6, Lu7, Lu8 other than the luminance component Lu5 are thinned out. The color difference component Cu1 at the lower left of FIG. 25 corresponds to the luminance component Lu1 that is not thinned out. Therefore, the prediction section 46 and the prediction section 96 can generate the predicted values of the color difference component Cu1 by substituting the value of the luminance component Lu1 into the right-hand side of the above Formula (1). On the other hand, for example, the color difference component Cu2 corresponds to the thinned luminance component Lu2. In this case, the prediction section 46 and the prediction section 96 generate the predicted values of the color difference component Cu2 using the value of any luminance component that is not thinned out. For example, the predicted value of the color difference component Cu2 may be replication of the predicted value of the color difference component Cu1 or a value obtained by linear interpolation of two predicted values of the color difference components Cu1, Cu5.

More generally, for example, the predicted pixel value $Pr_C(x, y)$ of the color difference component when the thinning rate is 25% may be calculated by techniques represented by the following Formula (5) or Formula (6). Formula (5) represents replication of a predicted value from adjacent pixels.

[Math 8]

$$Pr_C[x, y] = \begin{cases} \alpha \cdot Re'_L[x, y] + \beta & (x \bmod 2 = 0 \;\&\&\; y \bmod 2 = 0) \\ Pr_C[x-1, y] & (x \bmod 2 = 1 \;\&\&\; y \bmod 2 = 0) \\ Pr_C[x, y-1] & (x \bmod 2 = 0 \;\&\&\; y \bmod 2 = 1) \\ Pr_C[x-1, y-1] & (x \bmod 2 = 1 \;\&\&\; y \bmod 2 = 1) \end{cases} \quad (5)$$

Formula (6) represents linear interpolation of a predicted value.

[Math 9]

$$Pr_C[x, y] = \begin{cases} \alpha \cdot Re'_L[x, y] + \beta & (x \bmod 2 = 0 \;\&\&\; y \bmod 2 = 0) \\ \dfrac{(\alpha \cdot Re'_L[x-1, y] + \beta) + (\alpha \cdot Re'_L[x+1, y] + \beta)}{2} & (x \bmod 2 = 1 \;\&\&\; y \bmod 2 = 0) \\ \dfrac{(\alpha \cdot Re'_L[x, y-1] + \beta) + (\alpha \cdot Re'_L[x, y+1] + \beta)}{2} & (x \bmod 2 = 0 \;\&\&\; y \bmod 2 = 1) \\ \dfrac{(\alpha \cdot Re'_L[x-1, y-1] + \beta) + (\alpha \cdot Re'_L[x+1, y+1] + \beta)}{2} & (x \bmod 2 = 1 \;\&\&\; y \bmod 2 = 1) \end{cases} \quad (6)$$

Incidentally, Formula (5) and Formula (6) are only examples and other formulas may also be used.

The above thinning rate affects the amount of memory resources to hold pixel values after resampling of the luminance components. The amount of consumption of memory resources decreases with an increasing number of luminance components to be thinned out. However, if the number of luminance components to be thinned out is large, the accuracy of prediction of the color difference component may be degraded. Thus, the parameter to specify the thinning rate may be specified in the header (for example, the sequence parameter set, picture parameter set, or slice header) of an encoded stream. In this case, the prediction section 96 of the image decoding device 60 decides the thinning rate based on the parameter acquired from the header. Accordingly, the thinning rate can flexibly be changed in accordance with requirements (for example, which of saving of memory resources and encoding efficiency should have higher priority) for each device.

Figure 26A:
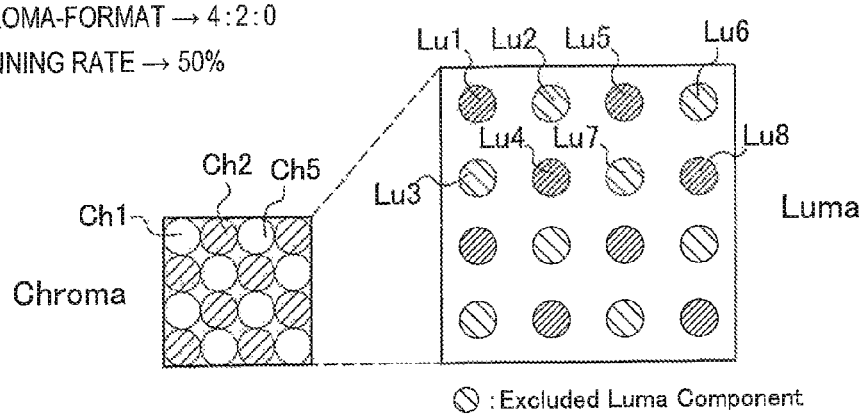
FIG. 26A is a first explanatory view illustrating a different thinning rate from the example in FIG. 25.
Figure 26B:
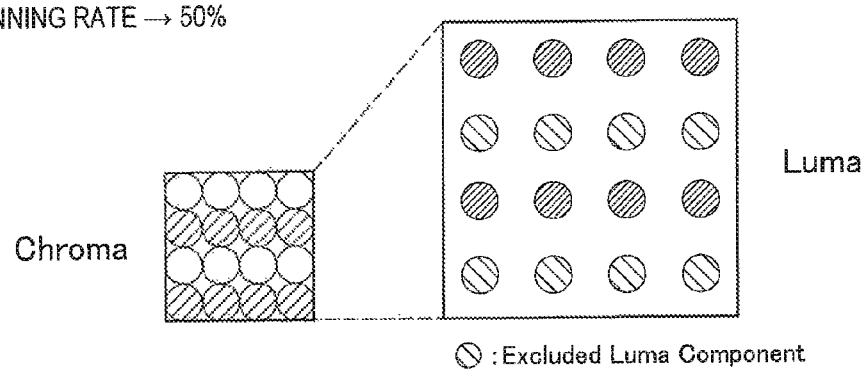
FIG. 26B is a second explanatory view illustrating a different thinning rate from the example in FIG. 25.
Figure 26C:
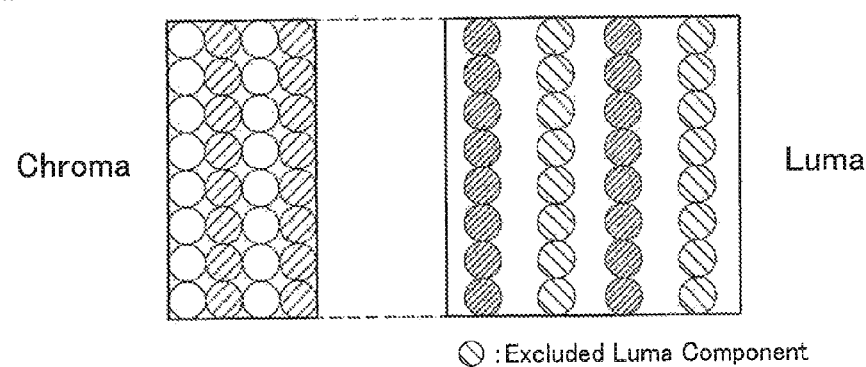
FIG. 26C is a third explanatory view illustrating a different thinning rate from the example in FIG. 25.

Referring to FIGS. 26A to 26C, in contrast to the example in FIG. 25, the thinning rate is 50% in each case. In these examples, half the luminance components of luminance components after resampling are thinned out. However, even if the thinning rate is the same, patterns of position of luminance components to be thinned out (hereinafter, called thinning patterns) are mutually different.

In the example of FIG. 26A, among four luminance components Lu1 to Lu4, the luminance components Lu2, Lu4 are thinned out. Similarly, among four luminance components Lu5 to Lu8, the luminance components Lu6, Lu8 are thinned out. Also in this case, for example, the predicted value of the color difference component Cu2 corresponding to the thinned luminance component Lu2 may be replication of the predicted value of the color difference component Cu1 or a value obtained by linear interpolation of two predicted values of the color difference components Cu1, Cu5. In the thinning pattern of FIG. 26A, luminance components to be thinned out are uniformly distributed in the PU. Therefore, compared with other thinning patterns of the same thinning rate, the thinning pattern in FIG. 26A realizes higher prediction accuracy.

In the example of FIG. 26B, luminance components are thinned out in every other row. Such a thinning pattern is advantageous in that, for example, in a device holding pixel values in a line memory, values of many luminance components can be accessed by memory access at a time. In the example of FIG. 26C, on the other hand, luminance components are thinned out in every other column. Such a thinning pattern is advantageous in that, for example, if the chroma-format is 4:2:2 and the number of pixels in the vertical direction is larger, more frequency components in the column direction can be maintained.

The parameter to specify the thinning pattern from a plurality of thinning pattern candidates may be specified in the header of an encoded stream. In this case, the prediction section 96 of the image decoding device 60 decides the positions of luminance components to be thinned out based on the parameter acquired from the header. Accordingly, the thinning pattern can flexibly be changed in accordance with requirements for each device.

In addition, the prediction section 46 and the prediction section 96 may decide the thinning rates in accordance with the above reference ratio. If, for example, the number of reference pixels referenced when coefficients of a prediction function are calculated is smaller, more luminance components may be thinned out. At this point, the prediction section 46 and the prediction section 96 may thin out luminance components in positions corresponding to thinning positions of reference pixels.

FIGS. 27A and 27B each show examples of correspondence between thinning positions of reference pixels and thinning positions of luminance components. In the example of FIG. 27A, the PU size is 16×16 pixels, the chroma-format is 4:2:0, and the reference ratio is 2:1. In this case, for example, the thinning rate is decided in favor of 25% and thinning patterns similar to examples in FIG. 25 may be selected. In the example of FIG. 27B, on the other hand, the PU size is 16×16 pixels, the chroma-format is 4:2:0, the reference ratio in the vertical direction is 2:1, and the reference ratio in the horizontal direction is 1:1. In this case, for example, the thinning rate is decided in favor of 50% and thinning patterns similar to the example in FIG. 26B may be selected.

In the example of FIG. 27A, all luminance components of the block to be predicted are thinned out in rows in which the reference pixel is thinned out. All luminance components of the block to be predicted are thinned out in columns in which the reference pixel is thinned out. By deciding thinning positions in this manner, the determination of thinning positions is simplified and the implementation of thinning processing according to the present modification can be made still easier. Also in the example of FIG. 27B, all luminance components of the block to be predicted are thinned out in rows in which the reference pixel is thinned out. By deciding thinning positions in this manner, access to luminance components can completely be skipped in rows corresponding to the thinning positions regardless of reference pixels or pixels to be predicted. Accordingly, the implementation of thinning processing is made still easier and also the processing speed can be increased by reducing the number of times of memory access.

[5-2. Second Modification]

In a second modification, the order of new processing by the intra prediction section 40 of the image encoding device 10 and the intra prediction section 90 of the image decoding device 60 are adopted.

Figure 28:
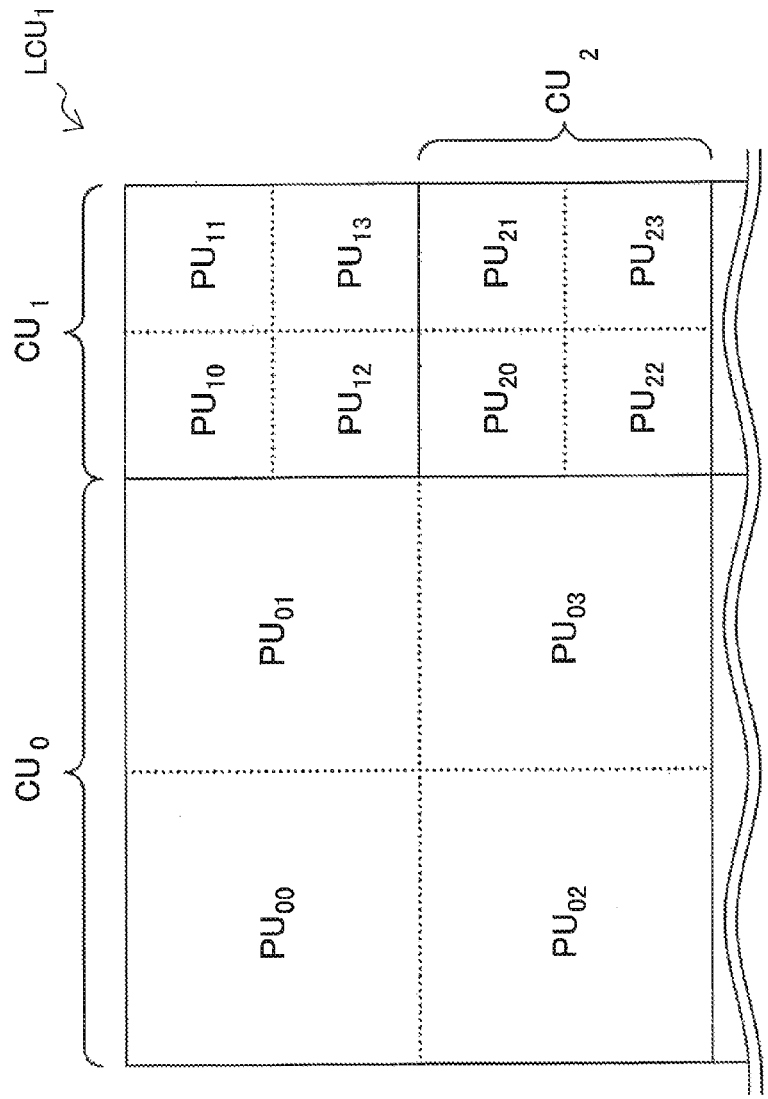
FIG. 28 is an explanatory view illustrating the order of new processing adopted for a second modification.

FIG. 28 is an explanatory view illustrating the order of new processing adopted for the present modification. Referring to FIG. 28, as an example, LCU including coding units $CU_0$, $CU_1$, $CU_2$ and other coding units is shown. Further, the coding unit $CU_0$ is divided into four prediction units $PU_{00}$, $PU_{01}$, $PU_{02}$, and $PU_{03}$. The coding unit $CU_1$ is divided into four prediction units $PU_{10}$, $PU_{11}$, $PU_{12}$, and $PU_{13}$. The coding unit $CU_2$ is divided into four prediction units $PU_{20}$, $PU_{21}$, $PU_{22}$, and $PU_{23}$. According to the existing technique, intra prediction processing for the LCU is performed like $Y_{00} \rightarrow Y_{01} \rightarrow Y_{02} \rightarrow Y_{03} \rightarrow Cb_{00} \rightarrow Cb_{01} \rightarrow Cb_{02} \rightarrow Cb_{03} \rightarrow Cr_{00} \rightarrow Cr_{01} \rightarrow Cr_{02} \rightarrow Cr_{03} \rightarrow Y_{10} \rightarrow \ldots$ $Y_{NN}$ represents an intra prediction of the luminance component of the prediction unit $PU_{NN}$ and $Cb_{NN}$ and $Cr_{NN}$ each represent an intra prediction of a color difference component of the prediction unit $PU_{NN}$. That is, according to the existing technique, intra prediction processing is performed for each component in each coding unit. Such an order of processing is here called an "order by component". In the present modification, on the other hand, for example, the prediction controller 42 of the intra prediction section 40 of the image encoding device 10 and the prediction controller 92 of the intra prediction section 90 of the image decoding device 60 control processing of each of sections so that intra prediction processing is performed for each prediction unit in each coding unit. Such an order of new processing is called an "order by PU". When, for example, the order by PU is applied to LCU in FIG. 28, intra prediction processing of the luminance component $Y_{00}$ and the two color difference components $Cb_{00}$, $Cr_{00}$ of the prediction unit $PU_{00}$ is first performed. Next, intra prediction processing of the luminance component $Y_{01}$ and the two color difference components $Cb_{01}$, $Cr_{01}$ of the prediction unit $PU_{01}$ is performed. Then, intra prediction processing of three components is repeated in the order of the prediction units $PU_{02}$, $PU_{03}$, $PU_{10}$, . . . .

In the order by component according to the existing technique, the amount of memory resources to hold luminance component values referenced for intra prediction in LM mode is affected by the size of the maximum coding unit. If, for example, the size of the maximum coding unit is 128×128 pixels, the chroma-format is 4:2:0, and the bit depth is 10 bits, memory resources of 64×64×10 bits are needed. In the order by PU described above, on the other hand, the amount of memory resources to hold luminance component values referenced for intra prediction in LM mode is affected by the size of the maximum prediction unit. If, for example, the coding unit is divided into four prediction units or more, the amount of memory resources needed for the case of the order by PU is one fourth the amount of memory resources needed for the case of the order by component. Therefore, by adopting the above order by PU, the amount of consumption of memory resources can be reduced.

<6. Example Application>

The image encoding device 10 and the image decoding device 60 according to the embodiment described above may be applied to various electronic appliances such as a transmitter and a receiver for satellite broadcasting, cable broadcasting such as cable TV, distribution on the Internet, distribution to terminals via cellular communication, and the like, a recording device that records images in a medium such as an optical disc, a magnetic disk or a flash memory, a reproduction device that reproduces images from such storage medium, and the like. Four example applications will be described below.

[6-1. First Example Application]

Figure 29:
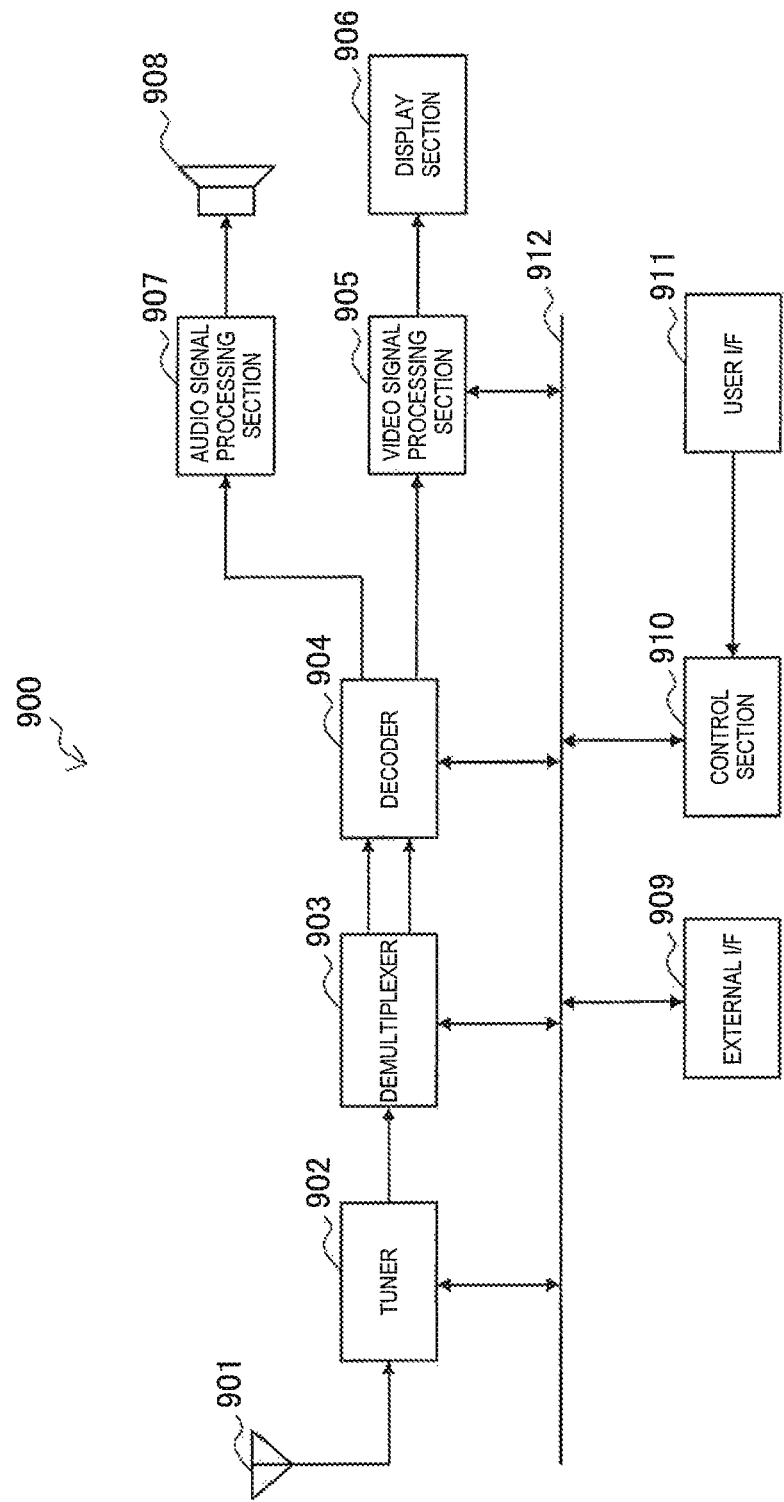
FIG. 29 is a block diagram showing an example of a schematic configuration of a television.

FIG. 29 is a block diagram showing an example of a schematic configuration of a television adopting the embodiment described above. A television 900 includes an antenna 901, a tuner 902, a demultiplexer 903, a decoder 904, an video signal processing section 905, a display section 906, an audio signal processing section 907, a speaker 908, an external interface 909, a control section 910, a user interface 911, and a bus 912.

The tuner 902 extracts a signal of a desired channel from broadcast signals received via the antenna 901, and demodulates the extracted signal. Then, the tuner 902 outputs an encoded bit stream obtained by demodulation to the demultiplexer 903. That is, the tuner 902 serves as transmission means of the televisions 900 for receiving an encoded stream in which an image is encoded.

The demultiplexer 903 separates a video stream and an audio stream of a program to be viewed from the encoded bit stream, and outputs each stream which has been separated to the decoder 904. Also, the demultiplexer 903 extracts auxiliary data such as an EPG (Electronic Program Guide) from the encoded bit stream, and supplies the extracted data to the control section 910. Additionally, the demultiplexer 903 may perform descrambling in the case the encoded bit stream is scrambled.

The decoder 904 decodes the video stream and the audio stream input from the demultiplexer 903. Then, the decoder 904 outputs video data generated by the decoding process to the video signal processing section 905. Also, the decoder 904 outputs the audio data generated by the decoding process to the audio signal processing section 907.

The video signal processing section 905 reproduces the video data input from the decoder 904, and causes the display section 906 to display the video. The video signal processing section 905 may also cause the display section 906 to display an application screen supplied via a network. Further, the video signal processing section 905 may perform an additional process such as noise removal, for example, on the video data according to the setting. Furthermore, the video signal processing section 905 may generate an image of a GUI (Graphical User Interface) such as a menu, a button, a cursor or the like, for example, and superimpose the generated image on an output image.

The display section 906 is driven by a drive signal supplied by the video signal processing section 905, and displays a video or an image on an video screen of a display device (for example, a liquid crystal display, a plasma display, an OLED, or the like).

The audio signal processing section 907 performs reproduction processes such as D/A conversion and amplification on the audio data input from the decoder 904, and outputs audio from the speaker 908. Also, the audio signal processing section 907 may perform an additional process such as noise removal on the audio data.

The external interface 909 is an interface for connecting the television 900 and an external appliance or a network. For example, a video stream or an audio stream received via the external interface 909 may be decoded by the decoder 904. That is, the external interface 909 also serves as transmission means of the televisions 900 for receiving an encoded stream in which an image is encoded.

The control section 910 includes a processor such as a CPU (Central Processing Unit), and a memory such as an RAM (Random Access Memory), an ROM (Read Only Memory), or the like. The memory stores a program to be executed by the CPU, program data, EPG data, data acquired via a network, and the like. The program stored in the memory is read and executed by the CPU at the time of activation of the television 900, for example. The CPU controls the operation of the television 900 according to an operation signal input from the user interface 911, for example, by executing the program.

The user interface 911 is connected to the control section 910. The user interface 911 includes a button and a switch used by a user to operate the television 900, and a receiving section for a remote control signal, for example. The user interface 911 detects an operation of a user via these structural elements, generates an operation signal, and outputs the generated operation signal to the control section 910.

The bus 912 interconnects the tuner 902, the demultiplexer 903, the decoder 904, the video signal processing section 905, the audio signal processing section 907, the external interface 909, and the control section 910.

In the television 900 configured as described above, the decoder 904 has a function of the image decoding device 60 according to the embodiment described above. Accordingly, an increase in processing cost accompanying the extension of block size can be curbed even when the LM mode is adopted for decoding images of the television 900.

[6-2. Second Example Application]

Figure 30:
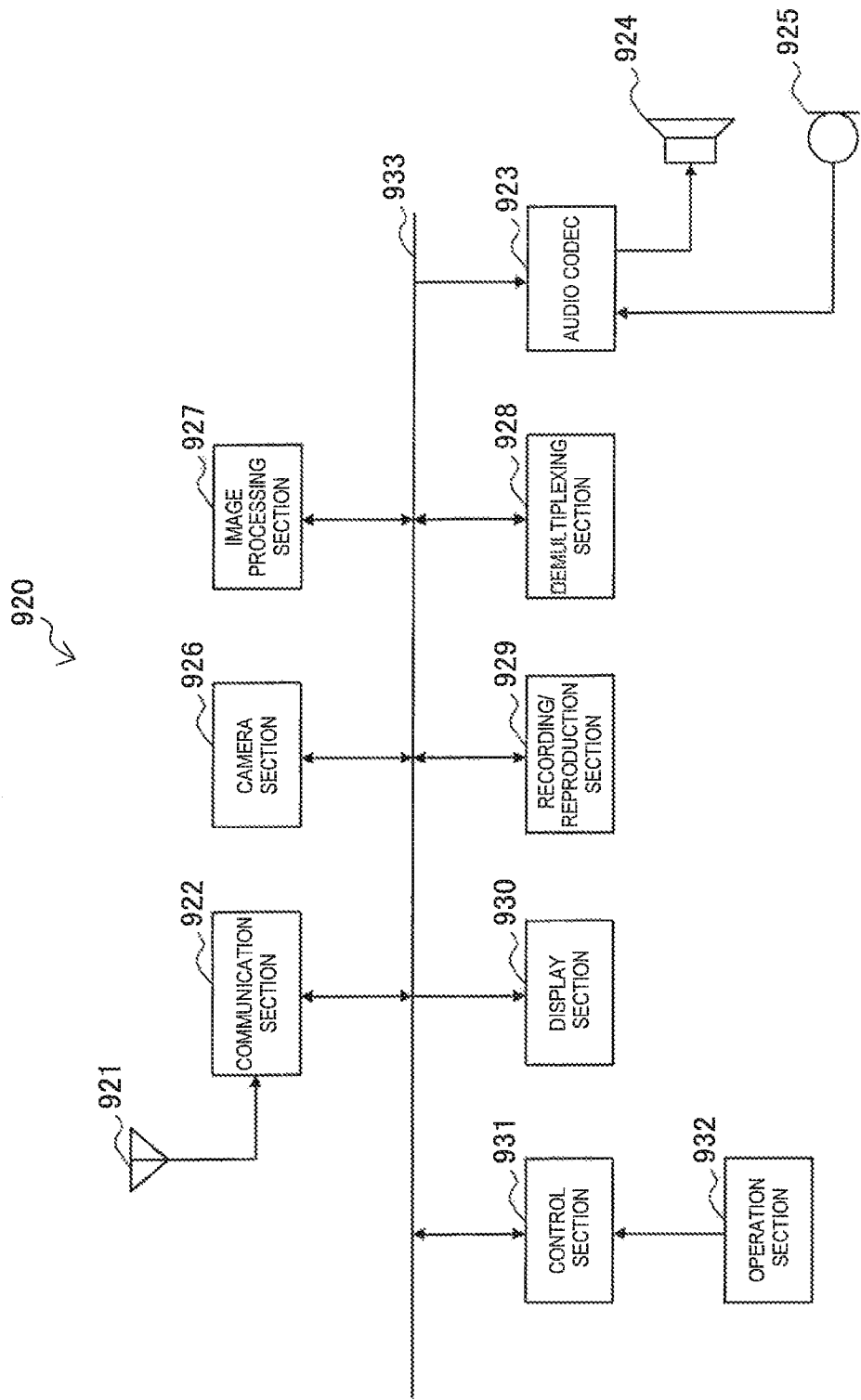
FIG. 30 is a block diagram showing an example of a schematic configuration of a mobile phone.

FIG. 30 is a block diagram showing an example of a schematic configuration of a mobile phone adopting the embodiment described above. A mobile phone 920 includes an antenna 921, a communication section 922, an audio codec 923, a speaker 924, a microphone 925, a camera section 926, an image processing section 927, a demultiplexing section 928, a recording/reproduction section 929, a display section 930, a control section 931, an operation section 932, and a bus 933.

The antenna 921 is connected to the communication section 922. The speaker 924 and the microphone 925 are connected to the audio codec 923. The operation section 932 is connected to the control section 931. The bus 933 interconnects the communication section 922, the audio codec 923, the camera section 926, the image processing section 927, the demultiplexing section 928, the recording/reproduction section 929, the display section 930, and the control section 931.

The mobile phone 920 performs operation such as transmission/reception of audio signal, transmission/reception of emails or image data, image capturing, recording of data, and the like, in various operation modes including an audio communication mode, a data communication mode, an image capturing mode, and a videophone mode.

In the audio communication mode, an analogue audio signal generated by the microphone 925 is supplied to the audio codec 923. The audio codec 923 converts the analogue audio signal into audio data, and A/D converts and compresses the converted audio data. Then, the audio codec 923 outputs the compressed audio data to the communication section 922. The communication section 922 encodes and modulates the audio data, and generates a transmission signal. Then, the communication section 922 transmits the generated transmission signal to a base station (not shown) via the antenna 921. Also, the communication section 922 amplifies a wireless signal received via the antenna 921 and converts the frequency of the wireless signal, and acquires a received signal. Then, the communication section 922 demodulates and decodes the received signal and generates audio data, and outputs the generated audio data to the audio codec 923. The audio codec 923 extends and D/A converts the audio data, and generates an analogue audio signal. Then, the audio codec 923 supplies the generated audio signal to the speaker 924 and causes the audio to be output.

Also, in the data communication mode, the control section 931 generates text data that makes up an email, according to an operation of a user via the operation section 932, for example. Moreover, the control section 931 causes the text to be displayed on the display section 930. Furthermore, the control section 931 generates email data according to a transmission instruction of the user via the operation section 932, and outputs the generated email data to the communication section 922. Then, the communication section 922 encodes and modulates the email data, and generates a transmission signal. Then, the communication section 922 transmits the generated transmission signal to a base station (not shown) via the antenna 921. Also, the communication section 922 amplifies a wireless signal received via the antenna 921 and converts the frequency of the wireless signal, and acquires a received signal. Then, the communication section 922 demodulates and decodes the received signal, restores the email data, and outputs the restored email data to the control section 931. The control section 931 causes the display section 930 to display the contents of the email, and also, causes the email data to be stored in the storage medium of the recording/reproduction section 929.

The recording/reproduction section 929 includes an arbitrary readable and writable storage medium. For example, the storage medium may be a built-in storage medium such as an RAM, a flash memory or the like, or an externally mounted storage medium such as a hard disk, a magnetic disk, a magneto-optical disk, an optical disc, an USB memory, a memory card, or the like.

Furthermore, in the image capturing mode, the camera section 926 captures an image of a subject, generates image data, and outputs the generated image data to the image processing section 927, for example. The image processing section 927 encodes the image data input from the camera section 926, and causes the encoded stream to be stored in the storage medium of the recording/reproduction section 929.

Furthermore, in the videophone mode, the demultiplexing section 928 multiplexes a video stream encoded by the image processing section 927 and an audio stream input from the audio codec 923, and outputs the multiplexed stream to the communication section 922, for example. The communication section 922 encodes and modulates the stream, and generates a transmission signal. Then, the communication section 922 transmits the generated transmission signal to a base station (not shown) via the antenna 921. Also, the communication section 922 amplifies a wireless signal received via the antenna 921 and converts the frequency of the wireless signal, and acquires a received signal. These transmission signal and received signal may include an encoded bit stream. Then, the communication section 922 demodulates and decodes the received signal, restores the stream, and outputs the restored stream to the demultiplexing section 928. The demultiplexing section 928 separates a video stream and an audio stream from the input stream, and outputs the video stream to the image processing section 927 and the audio stream to the audio codec 923. The image processing section 927 decodes the video stream, and generates video data. The video data is supplied to the display section 930, and a series of images is displayed by the display section 930. The audio codec 923 extends and D/A converts the audio stream, and generates an analogue audio signal. Then, the audio codec 923 supplies the generated audio signal to the speaker 924 and causes the audio to be output.

In the mobile phone 920 configured in this manner, the image processing section 927 has a function of the image encoding device 10 and the image decoding device 60 according to the embodiment described above. Accordingly, an increase in processing cost accompanying the extension of block size can be curbed even when the LM mode is adopted for encoding and decoding images of the mobile phone 920.

[6-3. Third Example Application]

Figure 31:
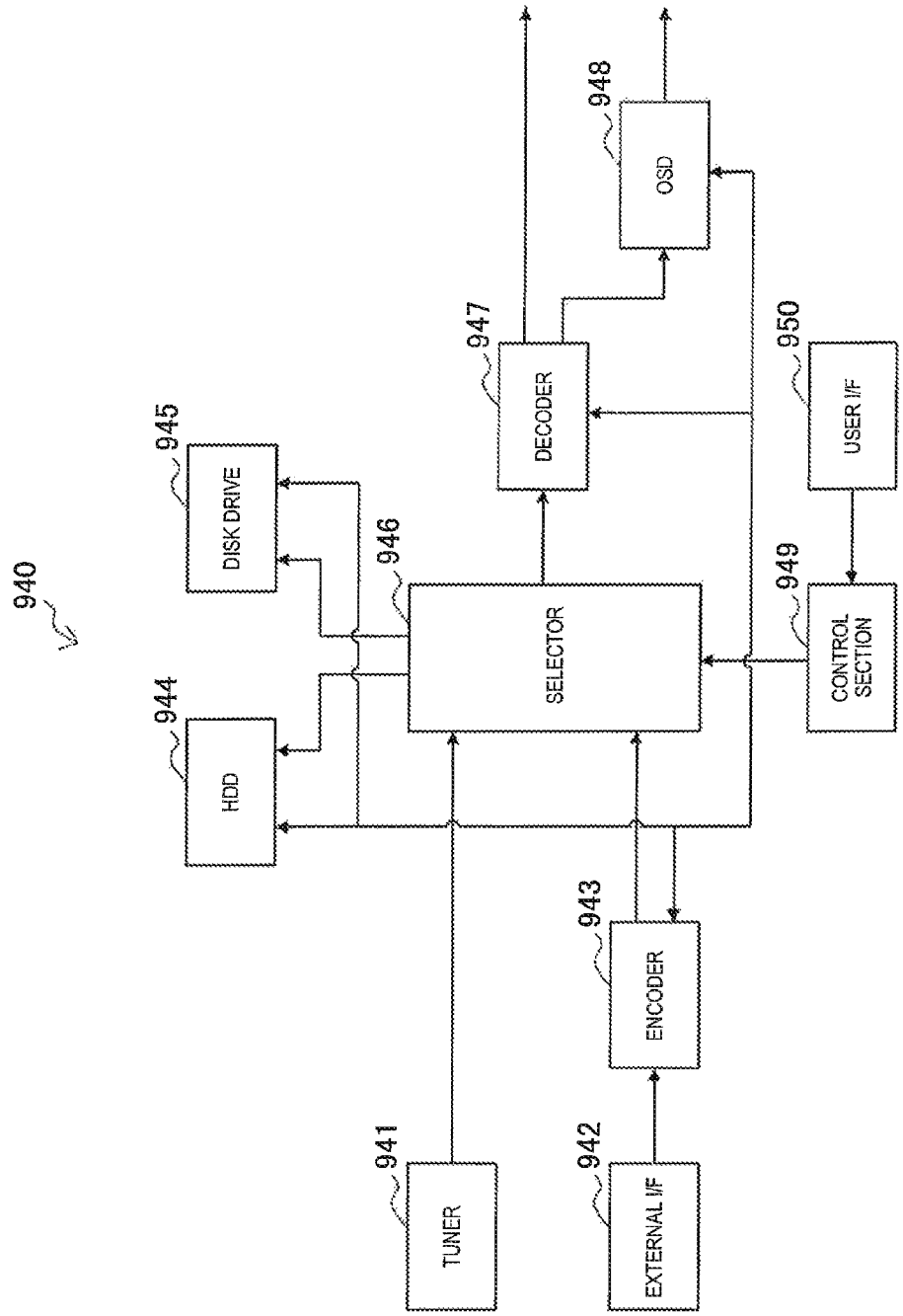
FIG. 31 is a block diagram showing an example of a schematic configuration of a recording/reproduction device.

FIG. 31 is a block diagram showing an example of a schematic configuration of a recording/reproduction device adopting the embodiment described above. A recording/reproduction device 940 encodes, and records in a recording medium, audio data and video data of a received broadcast program, for example. The recording/reproduction device 940 may also encode, and record in the recording medium, audio data and video data acquired from another device, for example. Furthermore, the recording/reproduction device 940 reproduces, using a monitor or a speaker, data recorded in the recording medium, according to an instruction of a user, for example. At this time, the recording/reproduction device 940 decodes the audio data and the video data.

The recording/reproduction device 940 includes a tuner 941, an external interface 942, an encoder 943, an HDD (Hard Disk Drive) 944, a disc drive 945, a selector 946, a decoder 947, an OSD (On-Screen Display) 948, a control section 949, and a user interface 950.

The tuner 941 extracts a signal of a desired channel from broadcast signals received via an antenna (not shown), and demodulates the extracted signal. Then, the tuner 941 outputs an encoded bit stream obtained by demodulation to the selector 946. That is, the tuner 941 serves as transmission means of the recording/reproduction device 940.

The external interface 942 is an interface for connecting the recording/reproduction device 940 and an external appliance or a network. For example, the external interface 942 may be an IEEE 1394 interface, a network interface, an USB interface, a flash memory interface, or the like. For example, video data and audio data received by the external interface 942 are input to the encoder 943. That is, the external interface 942 serves as transmission means of the recording/reproduction device 940.

In the case the video data and the audio data input from the external interface 942 are not encoded, the encoder 943 encodes the video data and the audio data. Then, the encoder 943 outputs the encoded bit stream to the selector 946.

The HDD 944 records in an internal hard disk an encoded bit stream, which is compressed content data of a video or audio, various programs, and other pieces of data. Also, the HDD 944 reads these pieces of data from the hard disk at the time of reproducing a video or audio.

The disc drive 945 records or reads data in a recording medium that is mounted. A recording medium that is mounted on the disc drive 945 may be a DVD disc (a DVD-Video, a DVD-RAM, a DVD-R, a DVD-RW, a DVD+, a DVD+RW, or the like), a Blu-ray (registered trademark) disc, or the like, for example.

The selector 946 selects, at the time of recording a video or audio, an encoded bit stream input from the tuner 941 or the encoder 943, and outputs the selected encoded bit stream to the HDD 944 or the disc drive 945. Also, the selector 946 outputs, at the time of reproducing a video or audio, an encoded bit stream input from the HDD 944 or the disc drive 945 to the decoder 947.

The decoder 947 decodes the encoded bit stream, and generates video data and audio data. Then, the decoder 947 outputs the generated video data to the OSD 948. Also, the decoder 904 outputs the generated audio data to an external speaker.

The OSD 948 reproduces the video data input from the decoder 947, and displays a video. Also, the OSD 948 may superimpose an image of a GUI, such as a menu, a button, a cursor or the like, for example, on a displayed video.

The control section 949 includes a processor such as a CPU, and a memory such as an RAM or an ROM. The memory stores a program to be executed by the CPU, program data, and the like. A program stored in the memory is read and executed by the CPU at the time of activation of the recording/reproduction device 940, for example. The CPU controls the operation of the recording/reproduction device 940 according to an operation signal input from the user interface 950, for example, by executing the program.

The user interface 950 is connected to the control section 949. The user interface 950 includes a button and a switch used by a user to operate the recording/reproduction device 940, and a receiving section for a remote control signal, for example. The user interface 950 detects an operation of a user via these structural elements, generates an operation signal, and outputs the generated operation signal to the control section 949.

In the recording/reproduction device 940 configured in this manner, the encoder 943 has a function of the image encoding device 10 according to the embodiment described above. Also, the decoder 947 has a function of the image decoding device 60 according to the embodiment described above. Accordingly, an increase in processing cost accompanying the extension of block size can be curbed even when the LM mode is adopted for encoding and decoding images of the recording/reproduction device 940.

[6-4. Fourth Example Application]

Figure 32:
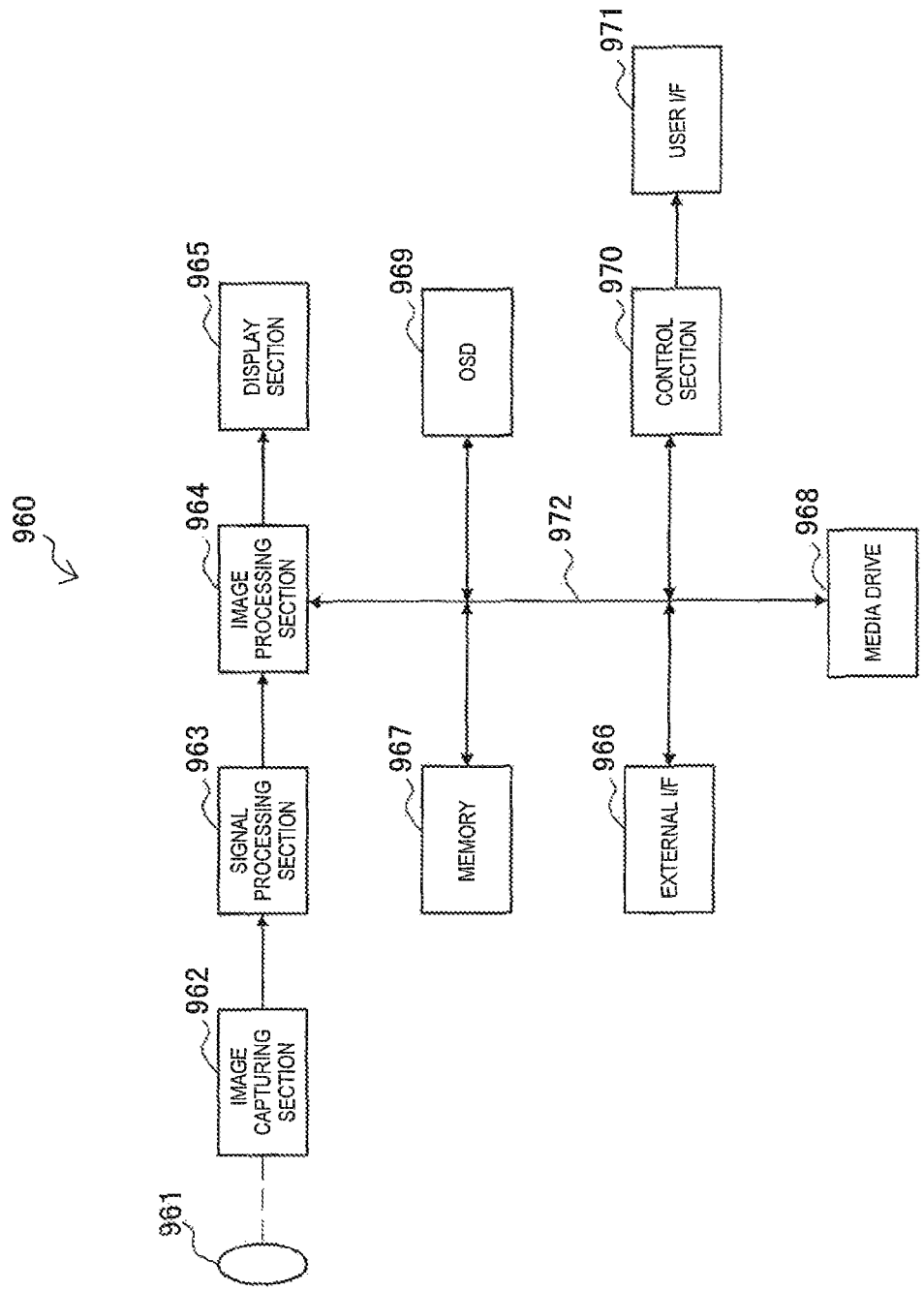
FIG. 32 is a block diagram showing an example of a schematic configuration of an image capturing device.

FIG. 32 is a block diagram showing an example of a schematic configuration of an image capturing device adopting the embodiment described above. An image capturing device 960 captures an image of a subject, generates an image, encodes the image data, and records the image data in a recording medium.

The image capturing device 960 includes an optical block 961, an image capturing section 962, a signal processing section 963, an image processing section 964, a display section 965, an external interface 966, a memory 967, a media drive 968, an OSD 969, a control section 970, a user interface 971, and a bus 972.

The optical block 961 is connected to the image capturing section 962. The image capturing section 962 is connected to the signal processing section 963. The display section 965 is connected to the image processing section 964. The user interface 971 is connected to the control section 970. The bus 972 interconnects the image processing section 964, the external interface 966, the memory 967, the media drive 968, the OSD 969, and the control section 970.

The optical block 961 includes a focus lens, an aperture stop mechanism, and the like. The optical block 961 forms an optical image of a subject on an image capturing surface of the image capturing section 962. The image capturing section 962 includes an image sensor such as a CCD, a CMOS or the like, and converts by photoelectric conversion the optical image formed on the image capturing surface into an image signal which is an electrical signal. Then, the image capturing section 962 outputs the image signal to the signal processing section 963.

The signal processing section 963 performs various camera signal processes, such as knee correction, gamma correction, color correction and the like, on the image signal input from the image capturing section 962. The signal processing section 963 outputs the image data after the camera signal process to the image processing section 964.

The image processing section 964 encodes the image data input from the signal processing section 963, and generates encoded data. Then, the image processing section 964 outputs the generated encoded data to the external interface 966 or the media drive 968. Also, the image processing section 964 decodes encoded data input from the external interface 966 or the media drive 968, and generates image data. Then, the image processing section 964 outputs the generated image data to the display section 965. Also, the image processing section 964 may output the image data input from the signal processing section 963 to the display section 965, and cause the image to be displayed. Furthermore, the image processing section 964 may superimpose data for display acquired from the OSD 969 on an image to be output to the display section 965.

The OSD 969 generates an image of a GUI, such as a menu, a button, a cursor or the like, for example, and outputs the generated image to the image processing section 964.

The external interface 966 is configured as an USB input/output terminal, for example. The external interface 966 connects the image capturing device 960 and a printer at the time of printing an image, for example. Also, a drive is connected to the external interface 966 as necessary. A removable medium, such as a magnetic disk, an optical disc or the like, for example, is mounted on the drive, and a program read from the removable medium may be installed in the image capturing device 960. Furthermore, the external interface 966 may be configured as a network interface to be connected to a network such as a LAN, the Internet or the like. That is, the external interface 966 serves as transmission means of the image capturing device 960.

A recording medium to be mounted on the media drive 968 may be an arbitrary readable and writable removable medium, such as a magnetic disk, a magneto-optical disk, an optical disc, a semiconductor memory or the like, for example. Also, a recording medium may be fixedly mounted on the media drive 968, configuring a non-transportable storage section such as a built-in hard disk drive or an SSD (Solid State Drive), for example.

The control section 970 includes a processor such as a CPU, and a memory such as an RAM or an ROM. The memory stores a program to be executed by the CPU, program data, and the like. A program stored in the memory is read and executed by the CPU at the time of activation of the image capturing device 960, for example. The CPU controls the operation of the image capturing device 960 according to an operation signal input from the user interface 971, for example, by executing the program.

The user interface 971 is connected to the control section 970. The user interface 971 includes a button, a switch and the like used by a user to operate the image capturing device 960, for example. The user interface 971 detects an operation of a user via these structural elements, generates an operation signal, and outputs the generated operation signal to the control section 970.

In the image capturing device 960 configured in this manner, the image processing section 964 has a function of the image encoding device 10 and the image decoding device 60 according to the embodiment described above. Accordingly, an increase in processing cost accompanying the extension of block size can be curbed even when the LM mode is adopted for encoding and decoding images of the image capturing device 960.

<7. Summary>

Heretofore, the image encoding device 10 and the image decoding device 60 according to an embodiment have been described using FIGS. 1 to 32. According to the present embodiment, when the LM mode using a function of the value of the corresponding luminance component is adopted for intra prediction of the color difference component for encoding or decoding images, the ratio of the number of reference pixels referenced to calculate coefficients of the function to the block size is variably controlled. Therefore, an increase in processing cost can be avoided or mitigated by curbing an increase of the number of reference pixels accompanying the extension of the block size.

Also according to the present embodiment, the ratio is controlled so that the number of reference pixels is constant when the block size exceeds a predetermined size. According to such a configuration, coefficients of the function can be calculated using a common circuit or logic for a plurality of block sizes. Therefore, an increase in scale of the circuit or logic caused by the adoption of the LM mode can also be curbed.

Also according to the present embodiment, reference pixels are not excessively reduced when the block size falls below a predetermined size. Therefore, the degradation of prediction accuracy in LM mode due to an insufficient number of reference pixels can be prevented. A relatively large block size can normally be set when an image in the block is monotonous and a prediction can easily be made. Therefore, when the block size is still larger, the risk of extreme degradation of prediction accuracy caused by the reduction of more reference pixels is small.

Also according to the present embodiment, the ratio can separately be controlled in the vertical direction and the horizontal direction of the block. According to such a configuration, coefficients of the function can be calculated using a common circuit or logic without being dependent on the chroma-format. In addition, it becomes possible to leave more reference pixels arranged along the horizontal direction that can be accessed with less amount of memory access and to reduce more reference pixels arranged along the vertical direction. Further, when the short distance intra prediction method is used, reference pixels to be reduced can adaptively be changed in accordance with the shape of the block.

According to the two modifications described above, the amount of consumption of memory resources in connection with the introduction of the LM mode can effectively be reduced.

Additionally, in the present specification, an example has been mainly described where the information about intra prediction and the information about inter prediction is multiplexed to the header of the encoded stream, and the encoded stream is transmitted from the encoding side to the decoding side. However, the method of transmitting this information is not limited to such an example. For example, this information may be transmitted or recorded as individual data that is associated with an encoded bit stream, without being multiplexed to the encoded bit stream. The term "associate" here means to enable an image included in a bit stream (or a part of an image, such as a slice or a block) and information corresponding to the image to link to each other at the time of decoding. That is, this information may be transmitted on a different transmission line from the image (or the bit stream). Or, this information may be recorded on a different recording medium (or in a different recording area on the same recording medium) from the image (or the bit stream). Furthermore, this information and the image (or the bit stream) may be associated with each other on the basis of arbitrary units such as a plurality of frames, one frame, a part of a frame or the like, for example.

Heretofore, a preferred embodiment of the present disclosure has been described in detail while referring to the appended drawings, but the technical scope of the present disclosure is not limited to such an example. It is apparent that a person having an ordinary skill in the art of the technology of the present disclosure may make various alterations or modifications within the scope of the technical ideas described in the claims, and these are, of course, understood to be within the technical scope of the present disclosure.

Additionally, the present technology may also be configured as below.

(1)

An image processing apparatus including:
a prediction section that generates a predicted value of a color difference component of a pixel of an image to be decoded by using a function of a value of a corresponding luminance component;
a coefficient calculation section that calculates a coefficient of the function used by the prediction section by referencing a pixel around a block to which the pixel belongs; and
a controller that controls a ratio of a number of reference pixels used by the coefficient calculation section to a block size of the block.

(2)

The image processing apparatus according to (1), wherein the controller controls the ratio in accordance with the block size.

(3)

The image processing apparatus according to (2), wherein the controller exercises control in a manner that the ratio when the block size is a first size becomes smaller than the ratio when the block size is a second size, which is smaller than the first size.

(4)

The image processing apparatus according to (3), wherein the controller controls the ratio in a manner that the number of reference pixels becomes constant when the block size exceeds a predetermined size.

(5)

The image processing apparatus according to (4), wherein the coefficient calculation section calculates the coefficient for a plurality of the block sizes exceeding the predetermined size using a common circuit or logic.

(6)

The image processing apparatus according to any one of (1) to (5), wherein the controller controls the ratio in accordance with mapping defined in advance between the block size and the ratio.

(7)

The image processing apparatus according to any one of (1) to (6), wherein the controller controls the ratio by changing the number of reference pixels thinned out upon calculating the coefficient.

(8)

The image processing apparatus according to (7), wherein the controller sets the number of reference pixels to be thinned out to zero when the block size falls below a predetermined size.

(9)

The image processing apparatus according to (1), wherein the controller separately controls a first ratio that is a ratio of a number of left reference pixels of the block to a size of the block in a vertical direction and a second ratio that is a ratio of a number of upper reference pixels of the block to a size of the block in a horizontal direction.

(10)

The image processing apparatus according to (9), wherein the controller controls the first ratio or the second ratio in a manner that the first ratio becomes equal to or less than the second ratio with respect to an identical block size.

(11)

The image processing apparatus according to (9), wherein when a short distance intra prediction method is used, the controller controls only a ratio corresponding to a direction to which one of the first ratio and the second ratio that is larger in size corresponds.

(12)

The image processing apparatus according to (9), wherein when a chroma-format representing a resolution of the color difference component is 4:2:2, the controller controls the first ratio in a manner that the number of the left reference pixels of the block becomes equal to the number of the upper reference pixels of the block.

(13)

The image processing apparatus according to (1), wherein the controller controls the ratio in accordance with a chroma-format representing a resolution of the color difference component.

(14)
The image processing apparatus according to (13), wherein the controller exercises control in a manner that the ratio when the chroma-format represents a first resolution becomes smaller than the ratio when the chroma-format represents a second resolution, which is lower than the first resolution.

(15)
The image processing apparatus according to (5), wherein when a bit depth of a pixel value exceeds a predetermined number of bits, the coefficient calculation section calculates the coefficient using the pixel values of the reference pixels reduced to the predetermined number of bits.

(16)
An image processing method including:
generating a predicted value of a color difference component of a pixel of an image to be decoded by using a function of a value of a corresponding luminance component;
calculating a coefficient of the function by referencing a pixel around a block to which the pixel belongs; and
controlling a ratio of a number of reference pixels used for calculating the coefficient to a block size of the block.

(17)
An image processing apparatus including:
a prediction section that generates a predicted value of a color difference component of a pixel of an image to be encoded by using a function of a value of a corresponding luminance component;
a coefficient calculation section that calculates a coefficient of the function used by the prediction section by referencing a pixel around a block to which the pixel belongs; and
a controller that controls a ratio of a number of reference pixels used by the coefficient calculation section to a block size of the block.

(18)
An image processing method including:
generating a predicted value of a color difference component of a pixel of an image to be encoded by using a function of a value of a corresponding luminance component;
calculating a coefficient of the function by referencing a pixel around a block to which the pixel belongs; and
controlling a ratio of a number of reference pixels used for calculating the coefficient to a block size of the block.

(19)
An image processing apparatus including:
a prediction section that makes an intra prediction of a color difference component of an image using a luminance component of the image to be decoded; and
a controller that variably controls a reference pixel referenced when the intra prediction is made by the prediction section.

(20)
An image processing method including:
making an intra prediction of a color difference component of an image using a luminance component of the image to be decoded; and
variably controlling a reference pixel referenced when the intra prediction of the color difference component is made.

REFERENCE SIGNS LIST

10 image encoding device (image processing apparatus)
42 prediction controller
44 coefficient calculation section (thinning section)
46 prediction section
60 image decoding device (image processing apparatus)
92 prediction controller
94 coefficient calculation section (thinning section)
96 prediction section

The invention claimed is:

1. An image processing device comprising:
an assigning unit configured to assign an encoding order for a current coding block including first block, second block, third block, and fourth block to the current coding block as a first luma block in the first block, a first chroma block in the first block, a second luma block in the second block, a second chroma block in the second block, a third luma block in the third block, a third chroma block in the third block, a fourth luma block in the fourth block, a fourth chroma block in the fourth block; and
an encoding unit configured to encode the current block according to the assigned encoding order,
wherein the assigning unit and the encoding unit are each implemented via at least one processor.

2. The image processing device according to claim 1, wherein
the chroma block includes a Cb block including a first chroma component and a Cr block including a second chroma component, and
the assigning unit assigns the encoding order as the first luma block in the first block, a first Cb block in the first block, a first Cr block in the first block, the second luma block in the second block, a second Cb block in the second block, a second Cr block in the second block, the third luma block in the third block, a third Cb block in the third block, a third Cr block in the third block, the fourth luma block in the fourth block, a fourth Cb block in the fourth block, the fourth Cr block in the fourth block.

3. The image processing device according to claim 2, wherein
the encoding unit encodes the current block in a format in which the number of chroma pixels is vertically and horizontally different from the number of luma pixels.

4. The image processing device according to claim 3, wherein
the color format is 4:2:0.

5. The image processing device according to claim 1, wherein
the assigning unit assigns the encoding order for the current coding block to be, in order from (1) to (8), of:
(1) encoding the first luma block in the first block, then
(2) encoding the first chroma block in the first block, then
(3) encoding the second luma block in the second block, then
(4) encoding the second chroma block in the second block, then
(5) encoding the third luma block in the third block, then
(6) encoding the third chroma block in the third block, then
(7) encoding the fourth luma block in the fourth block, and then
(8) encoding the fourth chroma block in the fourth block.

6. An image processing method comprising:
assigning an encoding order for a current coding block including first block, second block, third block, and fourth block to the current coding block as a first luma block in the first block, a first chroma block in the first block, a second luma block in the second block, a second chroma block in the second block, a third luma block in the third block, a third chroma block in the third block, a fourth luma block in the fourth block, a fourth chroma block in the fourth block; and encoding the current block according to the assigned encoding order.

7. The image processing method according to claim 6, wherein the chroma block includes a Cb block including a first chroma component and a Cr block including a second chroma component, and the encoding order is assigned as the first luma block in the first block, a first Cb block in the first block, a first Cr block in the first block, the second luma block in the second block, a second Cb block in the second block, a second Cr block in the second block, the third luma block in the third block, a third Cb block in the third block, a third Cr block in the third block, the fourth luma block in the fourth block, a fourth Cb block in the fourth block, the fourth Cr block in the fourth block.

8. The image processing method according to claim 7, wherein the current block is encoded in a format in which the number of chroma pixels is vertically and horizontally different from the number of luma pixels.

9. The image processing method according to claim 8, wherein the color format is 4:2:0.

10. The image processing method according to claim 6, wherein the encoding order for the current coding block is assigned to be, in order from (1) to (8), of:
(1) encoding the first luma block in the first block, then
(2) encoding the first chroma block in the first block, then
(3) encoding the second luma block in the second block, then
(4) encoding the second chroma block in the second block, then
(5) encoding the third luma block in the third block, then
(6) encoding the third chroma block in the third block, then
(7) encoding the fourth luma block in the fourth block, and then
(8) encoding the fourth chroma block in the fourth block.

11. A non-transitory computer-readable medium having embodied thereon a program, which when executed by a computer causes the computer to execute a method, the method comprising:

assigning an encoding order for a current coding block including first block, second block, third block, and fourth block to the current coding block as a first luma block in the first block, a first chroma block in the first block, a second luma block in the second block, a second chroma block in the second block, a third luma block in the third block, a third chroma block in the third block, a fourth luma block in the fourth block, a fourth chroma block in the fourth block; and encoding the current block according to the assigned encoding order.

12. The non-transitory computer-readable medium according to claim 11, wherein the chroma block includes a Cb block including a first chroma component and a Cr block including a second chroma component, and the encoding order is assigned as the first luma block in the first block, a first Cb block in the first block, a first Cr block in the first block, the second luma block in the second block, a second Cb block in the second block, a second Cr block in the second block, the third luma block in the third block, a third Cb block in the third block, a third Cr block in the third block, the fourth luma block in the fourth block, a fourth Cb block in the fourth block, the fourth Cr block in the fourth block.

13. The non-transitory computer-readable medium according to claim 12, wherein the current block is encoded in a format in which the number of chroma pixels is vertically and horizontally different from the number of luma pixels.

14. The non-transitory computer-readable medium according to claim 13, wherein the color format is 4:2:0.

15. The non-transitory computer-readable medium according to claim 11, wherein the encoding order for the current coding block is assigned to be, in order from (1) to (8), of:
(1) encoding the first luma block in the first block, then
(2) encoding the first chroma block in the first block, then
(3) encoding the second luma block in the second block, then
(4) encoding the second chroma block in the second block, then
(5) encoding the third luma block in the third block, then
(6) encoding the third chroma block in the third block, then
(7) encoding the fourth luma block in the fourth block, and then
(8) encoding the fourth chroma block in the fourth block.

* * * * *